(12) United States Patent
Joseph et al.

(10) Patent No.: US 9,316,513 B2
(45) Date of Patent: Apr. 19, 2016

(54) SYSTEM AND METHOD FOR CALIBRATING SENSORS FOR DIFFERENT OPERATING ENVIRONMENTS

(71) Applicant: Sensor Platforms, Inc., Mountain View, CA (US)

(72) Inventors: Benjamin E. Joseph, Mountain View, CA (US); Ian Chen, Campbell, CA (US); Kevin A Shaw, Millbrae, CA (US); James V. Steele, Los Gatos, CA (US)

(73) Assignee: Sensor Platforms, Inc., Mountain View, CA (US)

( * ) Notice: Subject to any disclaimer, the term of this patent is extended or adjusted under 35 U.S.C. 154(b) by 501 days.

(21) Appl. No.: 13/736,570

(22) Filed: Jan. 8, 2013

(65) Prior Publication Data

US 2013/0179108 A1 Jul. 11, 2013

Related U.S. Application Data

(60) Provisional application No. 61/584,309, filed on Jan. 8, 2012.

(51) Int. Cl.
*G01D 18/00* (2006.01)
*G06F 17/00* (2006.01)
(Continued)

(52) U.S. Cl.
CPC .............. *G01D 18/00* (2013.01); *G06F 3/0304* (2013.01); *G06F 3/038* (2013.01); *G06F 3/046* (2013.01); *G06F 3/0418* (2013.01); *G06F 17/00* (2013.01)

(58) Field of Classification Search
USPC ......................................... 702/104
See application file for complete search history.

(56) References Cited

U.S. PATENT DOCUMENTS

| | | | |
|---|---|---|---|
| 3,953,795 | A | 4/1976 | Brunner et al. |
| 4,263,494 | A | 4/1981 | Martin |

(Continued)

FOREIGN PATENT DOCUMENTS

| | | |
|---|---|---|
| EP | 1762287 | 3/2007 |
| EP | 2120134 A1 | 11/2009 |

(Continued)

OTHER PUBLICATIONS

Nithya Ramanathan, Rapid Deployment with Confidence: Calibration and Fault Detection in Environmental Sensor Networks, Center for Embedded Networked Sensing, UCLA, Department of Civil and Environmental Engineering, MIT, Jul. 4, 2006, pp. 1-14.*

(Continued)

*Primary Examiner* — Tung S Lau
(74) *Attorney, Agent, or Firm* — Carr & Ferrell LLP

(57) ABSTRACT

A computer system stores calibration information corresponding to respective sets of sensor measurements associated with respective operating environments. After storing, in a first data structure, calibration information for a first operating environment, the system determines a current operating environment of the device. When the current operating environment of the device is consistent with the first operating environment and the calibration information for the first operating environment meets predefined measurement diversity criteria, the system calibrates at least one sensor for the first operating environment using the stored calibration information for the first operating environment. When the current operating environment of the device is inconsistent with the first operating environment, the system excludes the stored calibration information for the first operating environment when calibrating one or more sensors for the current operating environment.

24 Claims, 13 Drawing Sheets

(51) Int. Cl.
*G06F 3/03* (2006.01)
*G06F 3/038* (2013.01)
*G06F 3/041* (2006.01)
*G06F 3/046* (2006.01)

(56) References Cited

U.S. PATENT DOCUMENTS

| | | |
|---|---|---|
| 4,318,186 A | 3/1982 | Wynn |
| 4,467,272 A | 8/1984 | Hassler et al. |
| 4,516,770 A | 5/1985 | Brookes et al. |
| 4,641,246 A | 2/1987 | Halbert et al. |
| 4,816,748 A | 3/1989 | Tazawa et al. |
| 4,847,783 A | 7/1989 | Grace et al. |
| 4,851,775 A | 7/1989 | Kim et al. |
| 5,128,671 A | 7/1992 | Thomas, Jr. |
| 5,161,311 A | 11/1992 | Esmer et al. |
| 5,239,264 A | 8/1993 | Hawks |
| 5,321,401 A | 6/1994 | White |
| 5,637,994 A | 6/1997 | Carder |
| 5,645,077 A | 7/1997 | Foxlin |
| 5,757,360 A | 5/1998 | Nitta et al. |
| 5,819,206 A | 10/1998 | Horton et al. |
| 5,874,941 A | 2/1999 | Yamada |
| 5,893,049 A | 4/1999 | Reggiardo |
| 6,072,467 A | 6/2000 | Walker |
| 6,157,894 A | 12/2000 | Hess et al. |
| 6,176,837 B1 | 1/2001 | Foxlin |
| 6,304,828 B1 | 10/2001 | Swanick et al. |
| 6,384,596 B1 | 5/2002 | Beyer |
| 6,882,086 B2 | 4/2005 | Kornbluh et al. |
| 7,139,983 B2 | 11/2006 | Kelts |
| 7,154,275 B2 | 12/2006 | Zank et al. |
| 7,158,118 B2 | 1/2007 | Liberty |
| 7,216,055 B1 | 5/2007 | Horton et al. |
| 7,262,760 B2 | 8/2007 | Liberty |
| 7,285,964 B1 | 10/2007 | Hsu et al. |
| 7,296,363 B2 | 11/2007 | Danisch et al. |
| 7,305,630 B2 | 12/2007 | Hullender et al. |
| 7,307,411 B1 | 12/2007 | Hsu et al. |
| 7,350,303 B2 | 4/2008 | Rock et al. |
| 7,414,611 B2 | 8/2008 | Liberty |
| 7,451,549 B1 | 11/2008 | Sodhi et al. |
| 7,647,185 B2 | 1/2010 | Tarassenko et al. |
| 7,815,508 B2 | 10/2010 | Dohta |
| 7,844,415 B1 | 11/2010 | Bryant et al. |
| 7,940,986 B2 | 5/2011 | Mekenkamp et al. |
| 7,978,178 B2 | 7/2011 | Pehlivan et al. |
| 8,184,100 B2 | 5/2012 | Lian et al. |
| 8,201,200 B2 | 6/2012 | Imai |
| 8,223,121 B2 | 7/2012 | Shaw et al. |
| 8,515,707 B2 | 8/2013 | Joseph et al. |
| 8,576,169 B2 | 11/2013 | Shaw et al. |
| 8,587,519 B2 | 11/2013 | Shaw et al. |
| 8,907,893 B2 | 12/2014 | Shaw et al. |
| 8,957,909 B2 | 2/2015 | Joseph et al. |
| 9,152,249 B2 | 10/2015 | Shaw et al. |
| 2002/0120217 A1 | 8/2002 | Adapathya et al. |
| 2002/0158815 A1 | 10/2002 | Zwern |
| 2002/0169553 A1 | 11/2002 | Perlmutter et al. |
| 2003/0018430 A1 | 1/2003 | Ladetto et al. |
| 2003/0023192 A1 | 1/2003 | Foxlin |
| 2003/0107888 A1 | 6/2003 | Devlin et al. |
| 2003/0149907 A1 | 8/2003 | Singh et al. |
| 2003/0164739 A1 | 9/2003 | Bae |
| 2004/0198463 A1 | 10/2004 | Knoedgen |
| 2004/0199674 A1 | 10/2004 | Brinkhus |
| 2005/0229117 A1 | 10/2005 | Hullender et al. |
| 2006/0033716 A1 | 2/2006 | Rosenberg et al. |
| 2006/0164384 A1 | 7/2006 | Smith et al. |
| 2006/0164386 A1 | 7/2006 | Smith et al. |
| 2006/0195254 A1 | 8/2006 | Ladetto et al. |
| 2006/0250358 A1 | 11/2006 | Wroblewski |
| 2007/0146319 A1 | 6/2007 | Masselle et al. |
| 2007/0234779 A1 | 10/2007 | Hsu et al. |
| 2007/0287911 A1 | 12/2007 | Haid et al. |
| 2008/0072234 A1 | 3/2008 | Myroup |
| 2008/0080789 A1 | 4/2008 | Marks et al. |
| 2008/0150891 A1 | 6/2008 | Berkley et al. |
| 2008/0211768 A1 | 9/2008 | Breen et al. |
| 2008/0281555 A1 | 11/2008 | Godin et al. |
| 2008/0284729 A1 | 11/2008 | Kurtenbach et al. |
| 2009/0009471 A1 | 1/2009 | Yamamoto et al. |
| 2009/0040175 A1 | 2/2009 | Xu et al. |
| 2009/0048021 A1 | 2/2009 | Lian et al. |
| 2009/0153349 A1 | 6/2009 | Lin et al. |
| 2009/0295722 A1 | 12/2009 | Yamamoto |
| 2009/0326857 A1 | 12/2009 | Mathews et al. |
| 2010/0039381 A1 | 2/2010 | Cretella, Jr. et al. |
| 2010/0060573 A1 | 3/2010 | Moussavi |
| 2010/0088061 A1 | 4/2010 | Horodezky et al. |
| 2010/0095773 A1 | 4/2010 | Shaw et al. |
| 2010/0097316 A1 | 4/2010 | Shaw et al. |
| 2010/0110001 A1 | 5/2010 | Yamamoto |
| 2010/0123605 A1 | 5/2010 | Wilson |
| 2010/0123656 A1 | 5/2010 | Park et al. |
| 2010/0149341 A1 | 6/2010 | Marks et al. |
| 2010/0150404 A1 | 6/2010 | Marks et al. |
| 2010/0156786 A1 | 6/2010 | Kabasawa et al. |
| 2010/0157168 A1 | 6/2010 | Dunton et al. |
| 2010/0174506 A1 | 7/2010 | Joseph et al. |
| 2010/0194879 A1 | 8/2010 | Pasveer et al. |
| 2010/0302145 A1 | 12/2010 | Langridge et al. |
| 2011/0163947 A1 | 7/2011 | Shaw et al. |
| 2011/0205156 A1 | 8/2011 | Gomez et al. |
| 2011/0239026 A1 | 9/2011 | Kulik |
| 2011/0241656 A1 | 10/2011 | Piemonte et al. |
| 2011/0242361 A1 | 10/2011 | Kuwahara et al. |
| 2012/0007713 A1 | 1/2012 | Nasiri et al. |
| 2012/0011351 A1 | 1/2012 | Mundra et al. |
| 2012/0086725 A1 | 4/2012 | Joseph et al. |
| 2013/0174636 A1 | 7/2013 | Joseph |
| 2013/0253821 A1 | 9/2013 | Joseph et al. |
| 2014/0055351 A1 | 2/2014 | Shaw et al. |
| 2014/0139432 A1 | 5/2014 | Shaw et al. |

FOREIGN PATENT DOCUMENTS

| | | |
|---|---|---|
| EP | 2485119 A2 | 8/2012 |
| EP | 2579127 A1 | 4/2013 |
| WO | WO2004047011 | 6/2004 |
| WO | WO 2005/040991 A2 | 5/2005 |
| WO | WO2005108119 | 11/2005 |
| WO | WO 2006/054295 A1 | 5/2006 |
| WO | WO2006090197 | 8/2006 |
| WO | WO2009093161 | 7/2009 |
| WO | WO2009132920 | 11/2009 |
| WO | WO2009156499 | 12/2009 |
| WO | WO2010048000 | 4/2010 |
| WO | WO2010080383 | 7/2010 |
| WO | WO2011085017 | 7/2011 |
| WO | WO 2011/109229 A1 | 9/2011 |
| WO | WO2012047494 | 4/2012 |
| WO | WO2013104006 | 7/2013 |
| WO | WO2013148585 | 10/2013 |

OTHER PUBLICATIONS

Y. Kim, Modeling and Calibration of a Multi-Spectral Imaging Sensor for In-Field Crop Nitrogen Assessment, 2006 American Society of Agricultural and Biological Engineers ISSN 0883-8542, pp. 935-941.*

Joseph Sedlak, Automated Attitude Sensor Calibration: Progress and Plans, AIAA/AAS Astrodynamics Specialist Conference, Providence, RI, Aug. 2004, p. 1-14.*

Vladimir Leonidovich Bychkovskiy, 2003, Distributed In-Place Calibration in Sensor Networks, 42 pages.*

Lewis Girod, The Design and Implementation of a Self-Calibrating Distributed Acoustic Sensing Platform, Copyright 2006 ACM 1-59593-343-3/06/0011 . . . $5.00, 14 pages.*

Sensor Platforms Inc., International Search Report and Written Opinion, PCT/US2013/020687, Sep. 13, 2013, 15 pgs.

(56) References Cited

OTHER PUBLICATIONS

International Search Report and Written Opinion mailed Sep. 13, 2013 in Patent Cooperation Treaty Application No. PCT/US2013/020687, filed Jan. 8, 2013.
Written Opinion mailed Nov. 30, 2011 in Patent Cooperation Treaty Application No. PCT/US2009/060475, filed Oct. 13, 2009.
Notice of Allowance, Aug. 28, 2015, U.S. Appl. No. 13/849,447, Mar. 22, 2013.
Ang, We Tech, et al., "Kalman Filtering for Real-Time Orientation Tracking of Handheld Microsurgical Instrument," Proceedings of 2004 IEEE/RSJ International Conference on Intelligent Robtos and Systems; Sep. 28-Oct. 2, 2004; Sendai, Japan pp. 2574-2580.
International Search Report and Written Opinion for International Application No. PCT/US2009/060475 mailed May 18, 2010.
International Search Report and Written Opinion for International Application No. PCT/US2009/067976 mailed May 3, 2010.
Simon, D., "Kalman Filtering" Embedded Systems Programming, Jun. 2001, 8 pages.
International Search Report and Written Opinion for International Application No. PCT/US2011/020242 mailed Apr. 12, 2011.
International Search Report and Written Opinion for International Application No. PCT/US2011/052185 mailed Jan. 31, 2012.
Foxlin, "Intertial Head-Tracker Sensor Fusion by a Complementary Separate-Bias Filter," 1996, IEEE pp. 185-195.
Foxlin et al., "Miniature 6-DOF Inertial System for Tracking HMDs," SPIE vol. 3362, Helmet and Head- Mounted Displays, III, AeroSense 98, Orlando, FL, Apr. 13-14, 1998 pp. 1-15.
International Search Report and Written Opinion for International Application No. PCT/US2012/020365 mailed May 23, 2012.
International Search Report and Written Opinion for International Application No. PCT/US2013/033723 mailed Jul. 29, 2013.
Sedlak, Joseph E. "Spinning Spacecraft Attitude Estimation Using Markley Variables: Filter Implementation and Results" NASA Goddard Space Flight Center CP-2005-212789, Greenbelt, MD (2005).
Luong-Van, D. et al. "Covariance Profiling for an Adaptive Kalman Filter to Suppress Sensor Quantization Effects" 43rd IEEE Conference on Decision and Control, vol. 3, pp. 2680-2685, Dec. 14-17, 2004.
Non-Final Office Action, Sep. 14, 2011, U.S. Appl. No. 12/338,996, filed Dec. 18, 2008.
Notice of Allowance, Mar. 21, 2012, U.S. Appl. No. 12/338,996, filed Dec. 18, 2008.
Non-Final Office Action, Mar. 22, 2011, U.S. Appl. No. 12/436,727, filed May 6, 2009.
Final Office Action, Sep. 8, 2011, U.S. Appl. No. 12/436,727, filed May 6, 2009.
Non-Final Office Action, Oct. 4, 2012, U.S. Appl. No. 12/436,727, filed May 6, 2009.
Notice of Allowance, Apr. 19, 2013, U.S. Appl. No. 12/436,727, May 6, 2009.
Non-Final Office Action, Jan. 23, 2013, U.S. Appl. No. 12/984,547, filed Jan. 4, 2011.
Notice of Allowance, Jul. 19, 2013, U.S. Appl. No. 12/984,547, filed Jan. 4, 2011.
Non-Final Office Action, Feb. 5, 2014, U.S. Appl. No. 13/165,690, filed Jun. 21, 2011.
Notice of Allowance, Sep. 3, 2014, U.S. Appl. No. 13/165,690, filed Jun. 21, 2011.
Non-Final Office Action, Aug. 18, 2014, U.S. Appl. No. 13/734,694, filed Jan. 4, 2013.
Final Office Action, Jun. 2, 2015, U.S. Appl. No. 13/734,694, filed Jan. 4, 2013.
Non-Final Office Action, Oct. 6, 2014, U.S. Appl. No. 13/849,447, filed Mar. 22, 2013.
Non-Final Office Action, Mar. 7, 2014, U.S. Appl. No. 14/066,578, filed Oct. 29, 2013.
Notice of Allowance, Jul. 22, 2014, U.S. Appl. No. 14/066,578, filed Oct. 29, 2013.
Non-Final Office Action, Sep. 10, 2014, U.S. Appl. No. 14/069,318, filed Oct. 31, 2013.
Non-Final Office Action, Jan. 30, 2007, U.S. Appl. No. 11/144,975, filed Jun. 3, 2005.
Notice of Allowance, Jul. 16, 2007, U.S. Appl. No. 11/144,975, filed Jun. 3, 2005.
Non-Final Office Action, Feb. 15, 2007, U.S. Appl. No. 11/642,479, filed Dec. 19, 2006.
Notice of Allowance, Aug. 1, 2007, U.S. Appl. No. 11/642,479, filed Dec. 19, 2006.
Notice of Allowance, May 7, 2015, U.S. Appl. No. 14/069,318, filed Oct. 31, 2013.

\* cited by examiner

SYSTEM AND METHOD FOR CALIBRATING SENSORS FOR DIFFERENT OPERATING ENVIRONMENTS

RELATED APPLICATIONS

This application claims the benefit of U.S. Provisional Application Ser. No. 61/584,309, filed Jan. 8, 2012, which application is incorporated by reference herein in its entirety.

TECHNICAL FIELD

The disclosed embodiments relate generally to calibrating sensors used for a human interface device.

BACKGROUND

A human interface device (e.g., a mouse, a trackball, etc.) may be used to interact with objects within a user interface. Some applications may need to know the navigational state (e.g., attitude and/or position) of the human interface device while the device is moving. One such example is an application that interfaces with a human interface device that may be freely moved in space (e.g., in one, two, or three dimensions of displacement and one, two or three dimensions of rotation or attitude) to position a cursor in a user interface, adjust display of overlaid objects in an augmented reality application or select a portion of a virtual world for display to a user of the device. However, sensors such as magnetometers and accelerometers that are used to determine the navigational state of a human interface device frequently have non-ideal characteristics coming straight from the factory and additional non-ideal characteristics may be introduced when integrating the sensors into the human interface device. These non-ideal characteristics may cause the device to function poorly or malfunction entirely. Calibrating these sensors can dramatically improve performance of the human interface device.

SUMMARY

However, some sensors are environmentally sensitive and thus operate differently in different operating environments. Thus, calibrating a sensor in one operating environment will not necessarily improve the performance of the sensor in a different operating environment. Consequently it would be advantageous to calibrate a sensor for a plurality of respective operating environments using operating environment specific calibration information that is based on sensor measurements collected with the sensor while the sensor is in the respective operating environment. In many situations, having calibration information enabling a sensor to be calibrated in multiple different operating environments will improve the accuracy of calibrated sensor measurements for the sensor when the sensor is in the different operating environments. However, when the calibration of a sensor is changed (e.g., due to a change in operating environment), discontinuities in the stream of calibrated sensor data caused by the change in calibration may result in jitter or other artifacts in output data that are perceptible to a user of the device. Thus, in some implementations, it is advantageous to provide an indication that calibration of one or more sensors has changed and that a discontinuity in calibrated sensor data has occurred to a module generating output data so that the module generating the output data can take steps to smooth the output data to avoid a discontinuity in the compensated sensor data that would cause jitter or other artifacts that would negatively affect the user experience.

Some embodiments provide a method for, at a computer system, at each respective time of a plurality of respective times collecting a respective set of sensor measurements from a first set of sensors of a device at the respective time and associating a respective operating environment of the device with the respective set of sensor measurements. The method further includes storing calibration information corresponding to the respective set of sensor measurements in a respective data structure associated with the respective operating environment of the device. The method also includes, after storing, in a first data structure, calibration information corresponding to a first operating environment, determining a current operating environment of the device and in accordance with a determination that the current operating environment of the device is consistent with the first operating environment and that the calibration information corresponding to the first operating environment meets predefined measurement diversity criteria, calibrating at least one sensor of the first set of one or more sensors for the first operating environment using the sensor measurements from the first data structure. In accordance with a determination that the current operating environment of the device is inconsistent with the first operating environment, the method also includes excluding the information stored in the first data structure from consideration when calibrating one or more sensors of the first set of sensors for the current operating environment.

Some embodiments provide a method for, at a computer system receiving a stream of sensor data from a set of one or more sensors of a device, where a first filter generates compensated sensor data based on the stream of sensor data and a second filter generates output information based on the compensated sensor data. The method further includes, while receiving the stream of sensor data determining that the first filter has been or will be modified in a way that will create a discontinuity in the compensated sensor data and in response to the determination, adjusting the second filter to compensate for the discontinuity in the compensated sensor data. The method also includes, after adjusting the second filter, generating, via the adjusted second filter, output information based on the compensated sensor data.

In accordance with some embodiments, a computer system (e.g., a human interface device or a host computer system) includes one or more processors, memory, and one or more programs; the one or more programs are stored in the memory and configured to be executed by the one or more processors and the one or more programs include instructions for performing the operations of any of the methods described above. In accordance with some embodiments, a non-transitory computer readable storage medium (e.g., for use by a human interface device or a host computer system) has stored therein instructions which when executed by one or more processors, cause a computer system (e.g., a human interface device or a host computer system) to perform the operations of any of the methods described above.

BRIEF DESCRIPTION OF THE DRAWINGS

Like reference numerals refer to corresponding parts throughout the drawings.

DESCRIPTION OF EMBODIMENTS

Exemplary Use Cases

Human interface devices that have a determinable multi-dimensional navigational state (e.g., one or more dimensions of displacement and/or one or more dimensions of rotation or attitude) are becoming increasingly common for providing user input for many different types of user interfaces. For example, such a human interface device may be used as a multi-dimensional pointer to control a pointer (e.g., a cursor) on a display of a personal computer, television, gaming system, etc. As another example, such a human interface device may be used to provide augmented reality views (e.g., by overlaying computer generated elements over a display of a view of the real world) that change in accordance with the navigational state of the human interface device so as to match up with a view of the real world that is detected on a camera attached to the human interface device. As yet another example, such a human interface device may be used to provide views of a virtual world (e.g., views of portions of a video game, computer generated simulation, etc.) that change in accordance with the navigational state of the human interface device so as to match up with a virtual viewpoint of the user based on the orientation of the device. In this document, the terms orientation, attitude and rotation are used interchangeably to refer to the orientation of a device or object with respect to a frame of reference.

In order to function properly (e.g., return results to the user that correspond to movements of the human interface device in predictable ways), these applications rely on well calibrated sensors that provide a consistent and accurate mapping between the sensor outputs and the navigational state of the human interface device. While specific use cases are described above and will be used to illustrate the general concepts described below, it should be understood that these examples are non-limiting examples and that the embodiments described herein would apply in an analogous manner to any human interface device that would benefit from calibrated sensors.

System Overview

Figure 1:
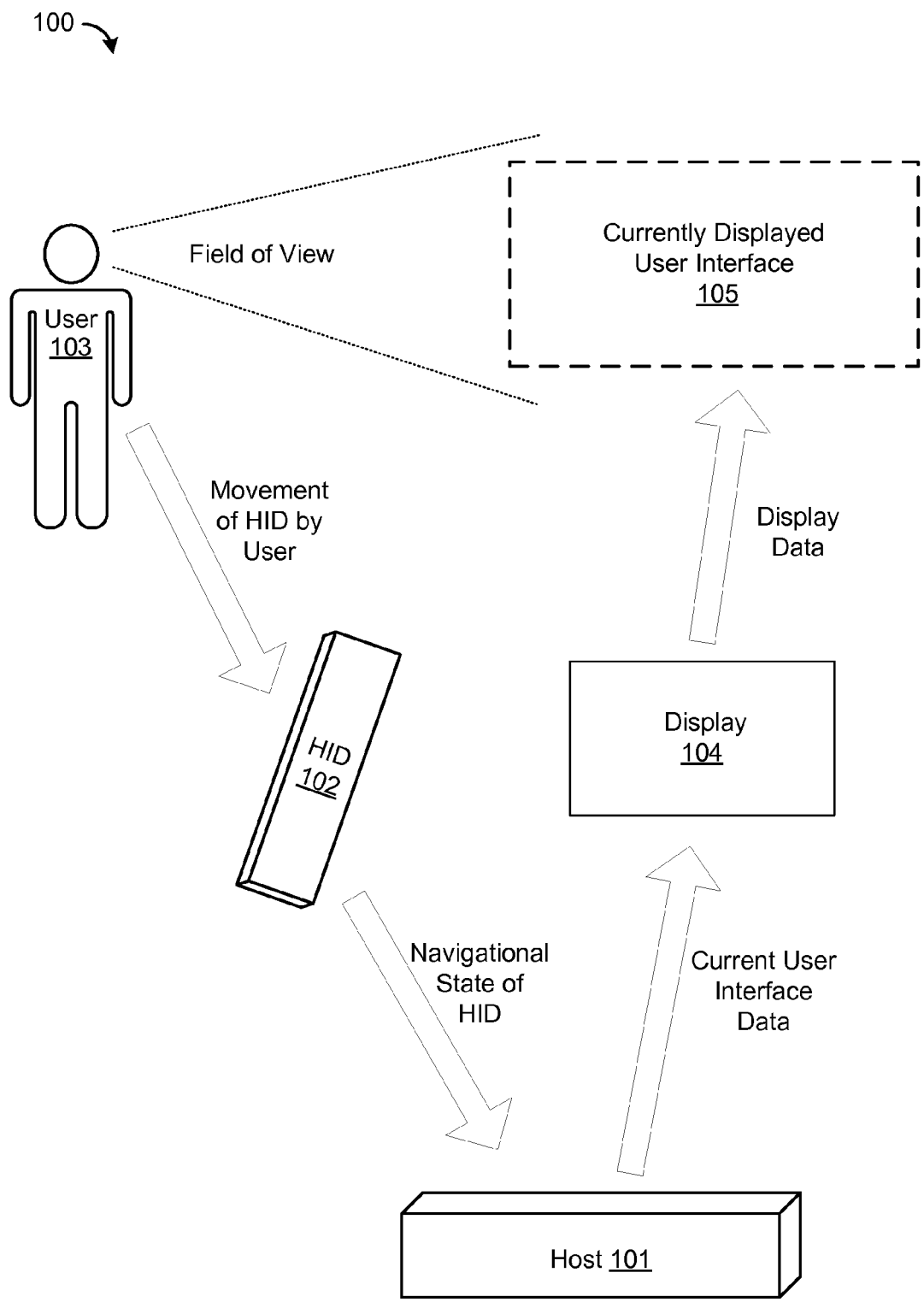
FIG. 1 illustrates a system for using a human interface device to manipulate a user interface, according to some embodiments.

Attention is now directed to FIG. 1, which illustrates an example system 100 for using a human interface device to manipulate a user interface. As shown in FIG. 1, an example Human Interface Device 102 (hereinafter "Device 102") is coupled to a Host Computer System 101 (hereinafter "Host 101") through a wireless interface, according to some embodiments. In these embodiments, a User 103 moves Device 102. These movements are detected by sensors in Device 102, as described in greater detail below with reference to FIG. 2. Device 102, or Host 101, generates a navigational state of Device 102 based on sensor measurements from the sensors and transmits the navigational state to Host 101. Host 101 generates current user interface data based on the navigational state of Device 102 and transmits the current user interface data to Display 104 (e.g., a display or a projector), which generates display data which is displayed to the user as the currently displayed User Interface 105. While Device 102, Host 101 and Display 104 are shown in FIG. 1 as being separate, in some embodiments the functions of one or more of these elements are combined or rearranged, as described in greater detail below with reference to FIGS. 3A-3E.

Thus, the user can use Device 102 to issue commands for modifying the user interface, control objects in the user interface, and/or position objects in the user interface by moving Device 102 so as to change its navigational state. In some embodiments, Device 102 is sensitive to six degrees of freedom: displacement along the x-axis, displacement along the y-axis, displacement along the z-axis, yaw, pitch, and roll.

In some embodiments, the wireless interface is selected from the group consisting of: a Wi-Fi interface, a Bluetooth interface, an infrared interface, an audio interface, a visible light interface, a radio frequency (RF) interface, and any combination of the aforementioned wireless interfaces. In some embodiments, the wireless interface is a unidirectional wireless interface from Device 102 to Host 101. In some embodiments, the wireless interface is a bidirectional wireless interface. In some embodiments, bidirectional communication is used to perform handshaking and pairing operations. In some embodiments, a wired interface is used instead of or in addition to a wireless interface. As with the wireless interface, the wired interface may be a unidirectional or bidirectional wired interface.

In some embodiments, data corresponding to a navigational state of Device 102 (e.g., raw measurements, calculated attitude, correction factors, position information, etc.) is transmitted from Device 102 and received and processed on Host 101 (e.g., by a host side device driver). Host 101 uses this data to generate current user interface data (e.g., specifying a position of a cursor and/or other objects in a user interface).

Figure 2:
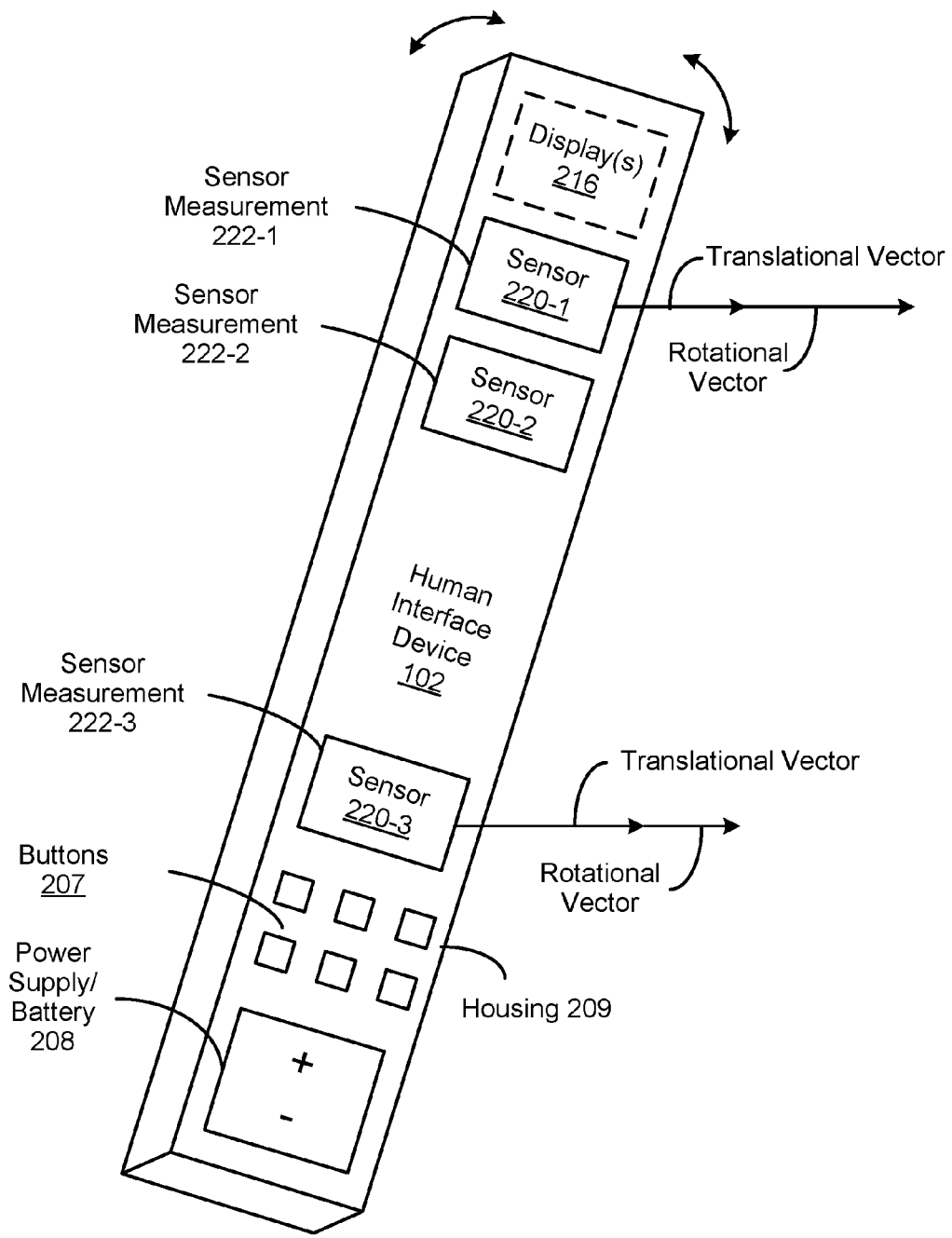
FIG. 2 is a block diagram illustrating an example human interface device, according to some embodiments.

Attention is now directed to FIG. 2, which illustrates an example of Device 102, according to some embodiments. In accordance with some embodiments, Device 102 includes one or more sensors 220 which produce sensor outputs 222, which can be used to determine a navigational state of Device 102. For example, in one implementation, Sensor 220-1 and Sensor 220-3 are multi-dimensional accelerometers generating multi-dimensional accelerometer measurements and Sensor 220-2 is a multi-dimensional magnetometer generating multi-dimensional magnetometer measurements. In some implementations Sensors 220 include one or more of gyroscopes, beacon sensors, inertial measurement units, temperature sensors, barometers, proximity sensors, single-dimensional accelerometers and multi-dimensional accelerometers instead of or in addition to the multi-dimensional accelerometers and multi-dimensional magnetometer described above. In some embodiments, Device 102 also includes Buttons 207, Power Supply/Battery 208, Camera (not shown in the example in FIG. 2; see "camera(s)" 1180 in FIG. 8) and/or Display 216 (e.g., a display or projector). In some embodiments, Device 102 also includes one or more of the following additional user interface components: one or more processors, memory, a keypad, one or more thumb wheels, one or more light-emitting diodes (LEDs), an audio speaker, an audio microphone, a liquid crystal display (LCD), etc. In some embodiments, the various components of Device 102 (e.g., Sensors 220, Buttons 207, Power Supply 208, Camera and Display 216) are all enclosed in Housing 209 of Device 102.

In some embodiments, the one or more processors (e.g., 1102, FIG. 8) of Device 102 perform one or more of the following operations: sampling Sensor Measurements 222, at a respective sampling rate, produced by Sensors 220; processing sampled data to determine displacement; transmitting displacement information to Host 101; monitoring the battery voltage and alerting Host 101 when the charge of Battery 208 is low; monitoring other user input devices (e.g., keypads, buttons, etc.), if any, on Device 102 and, as appropriate, transmitting information identifying user input device events (e.g., button presses) to Host 101; continuously or periodically running background processes to maintain or update calibration of Sensors 220; providing feedback to the user as needed on the remote (e.g., via LEDs, etc.); and recognizing gestures performed by user movement of Device 102.

Attention is now directed to FIGS. 3A-3E, which illustrate configurations of various components of the system for using a human interface device to manipulate a user interface. In some embodiments, there are three fundamental components to the system for using a human interface device to manipulate a user interface described herein: Sensors 220, which provide sensor measurements that are used to determine a navigational state of Device 102, User Interface Module 322 which uses the navigational state of Device 102 to determine current user interface data, and Display 104, which displays the currently displayed user interface to the user of Device 102. It should be understood that these components can be distributed among any number of different devices.

Figure 3A:
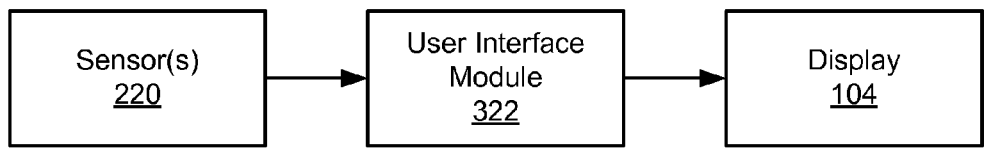
FIGS. 3A-3E are block diagrams illustrating configurations of various components of the system including a human interface device, according to some embodiments.
Figure 3B:
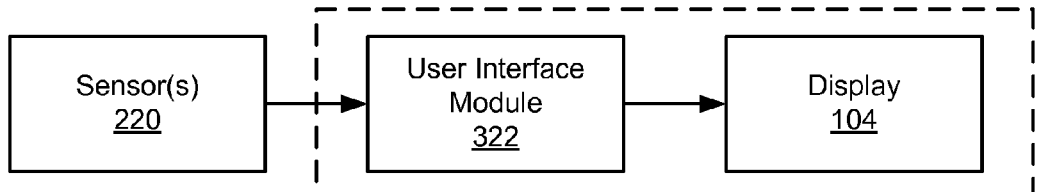
Figure 3C:
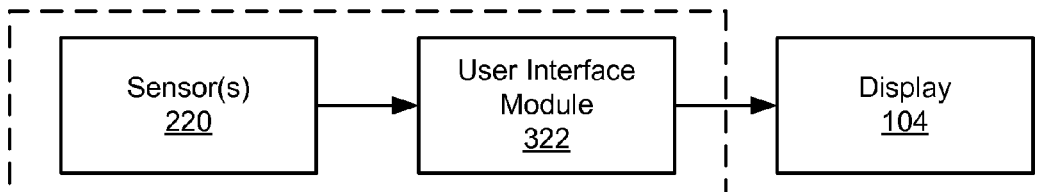
Figure 3D:
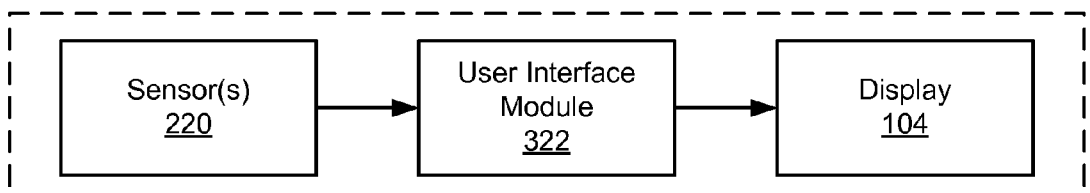
Figure 3E:
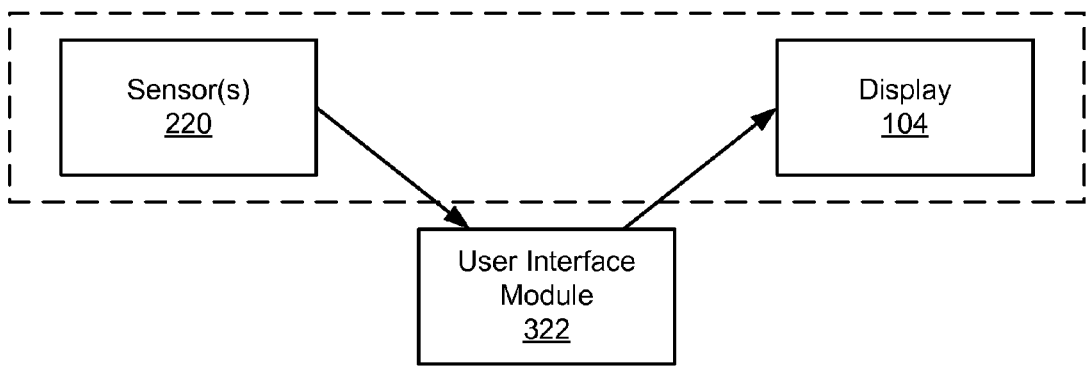

As one example, in FIG. 3A, Sensors 220, User Interface Module 322 and Display 104 are distributed between three different devices (e.g., a human interface device, a set top box, and a television, respectively). As another example, in FIG. 3B, Sensors 220 are included in a first device (e.g., a human interface device), while the user interface module 322 and Display 104 are included in a second device (e.g., a host with an integrated display). As another example, in FIG. 3C, Sensors 220 and User Interface Module 322 are included in a first device (e.g., a "smart" human interface device), while Display 104 is included in a second device (e.g., a television). As yet another example, in FIG. 3D, Sensors 220, User Interface Module 322 and Display 104 are included in a single device (e.g., a mobile computing device, such as a smart phone, personal digital assistant, tablet computer, etc., with an augmented reality application). As a final example, in FIG. 3E, Sensors 220 and Display 104 are included in a first device (e.g., a game controller with a display/projector), while User Interface Module 322 is included in a second device (e.g., a game console/server). It should be understood that in the example shown in FIG. 3E, the first device will typically be a portable device with limited processing power, while the second device is a device (e.g., a host computer system) with the capability to perform more complex processing operations, or to perform processing operations at greater speed, and thus the computationally intensive calculations are offloaded from the portable device to the device with greater processing power. While a plurality of common examples have been described above, it should be understood that the embodiments described herein are not limited to the examples described above, and other distributions of the various components could be made without departing from the scope of the described embodiments.

Sensor Calibration

One goal of sensor calibration is to improve the accuracy of sensor measurements from the calibrated sensors, which can be accomplished by changing the output of the sensors and/or determining a set of conversion values that can be used to compensate for error in raw sensor measurements. Many devices use MEMS (Microelectromechanical system) sensors due to the attractive price/performance characteristics of MEMS sensors. In particular MEMS sensors are typically relatively inexpensive and, when properly calibrated, provide sensor measurements that are sufficiently accurate for most commercial applications in consumer electronic devices such as cell phones, cameras and game controllers.

In some embodiments the operation of such sensors is affected by a current operating environment in which the sensors are being operated. For example, a temperature change may affect the performance of a magnetometer or accelerometer. Similarly, the steel structure of a building may skew a magnetic field measured by a magnetometer. While these operating environment based effects can be compensated for by recalibrating the sensors for a current operating environment, once the sensors enter a new operating environment the calibration of the sensors for the prior operating environment will in some circumstances result in a reduced accuracy of calibrated sensor measurements. In some situations using an operating-environment-specific calibration for a first operating environment for collecting sensor measurements in a second different operating environment will produce less accurate calibrated sensor measurements than using an operating-environment-independent calibration of the sensors would have produced (e.g., because the operating-environment-specific calibration for the first operating environment is adapted for specific characteristics of the first operating environment that are different from characteristics of the second operating environment). Thus, it would be advantageous to generate a new calibration when the operating environment in which the sensors are located changes (e.g., due to movement of the sensors to a new operating environment or changes in the operating environment at the current location of the sensors).

Calibrating sensors (e.g., MEMS sensors) typically requires collecting sensor measurements having sufficient measurement diversity in the measurement space for the MEMS sensor. For example, for an accelerometer or a magnetometer the measurement space is orientation based and thus measurement diversity for an accelerometer or magnetometer means collecting sensor values from the accelerometer or magnetometer to a plurality of different device orientations. In contrast, for a gyroscope, the measurement space is movement based, and thus measurement diversity for a gyroscope means collecting sensor values from the gyroscope while Device 102 is rotating about different axes. In embodiments where one or more of the sensors to be calibrated is affected by changes in the operating environment, in order to calibrate the sensor for a respective operating environment a diversity of measurements are collected while the sensor is within the respective operating environment.

Figure 4:
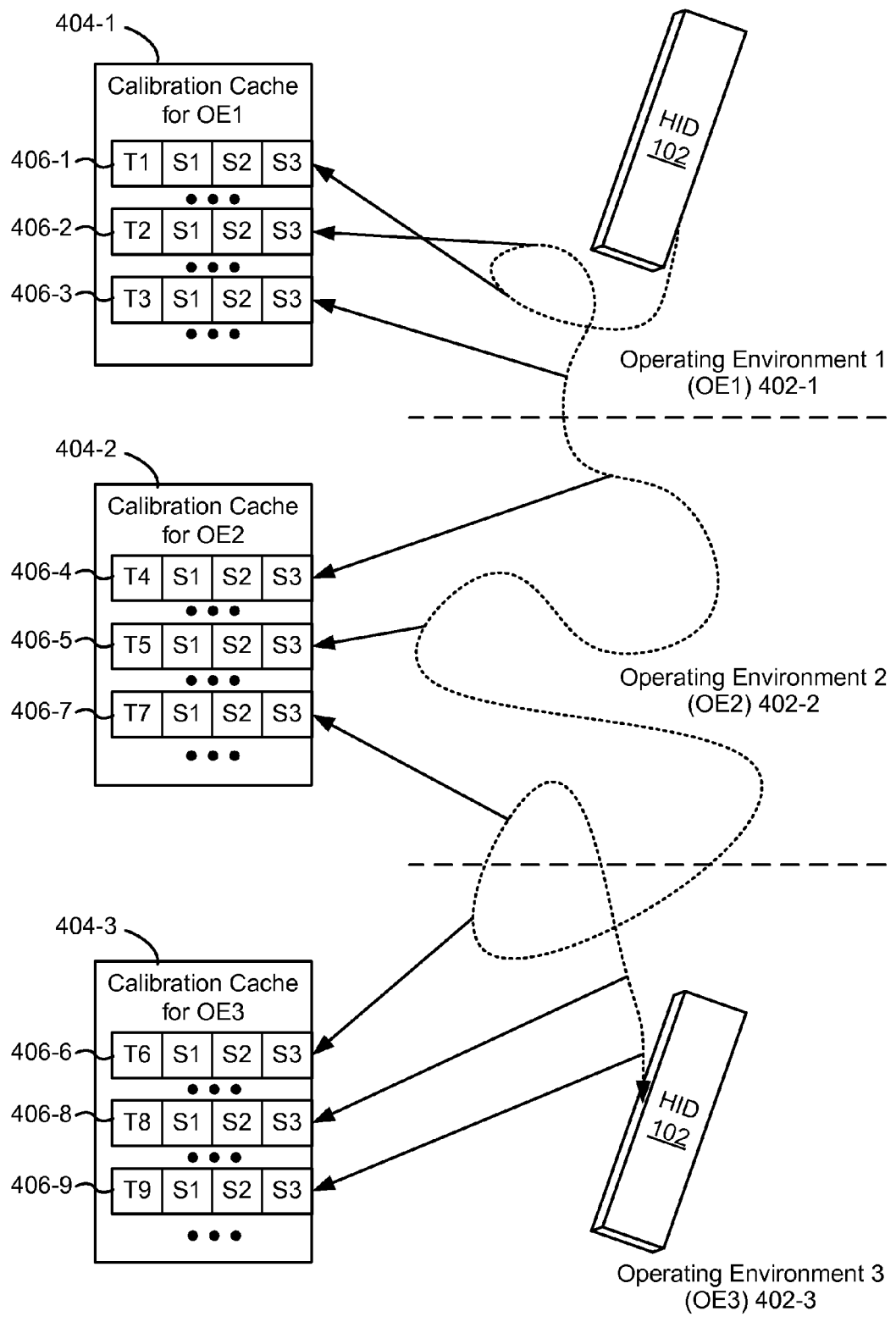
FIG. 4 is a diagram illustrating an example of collecting sets of sensor measurements in different operating environments, according to some embodiments.
Figure 5A:
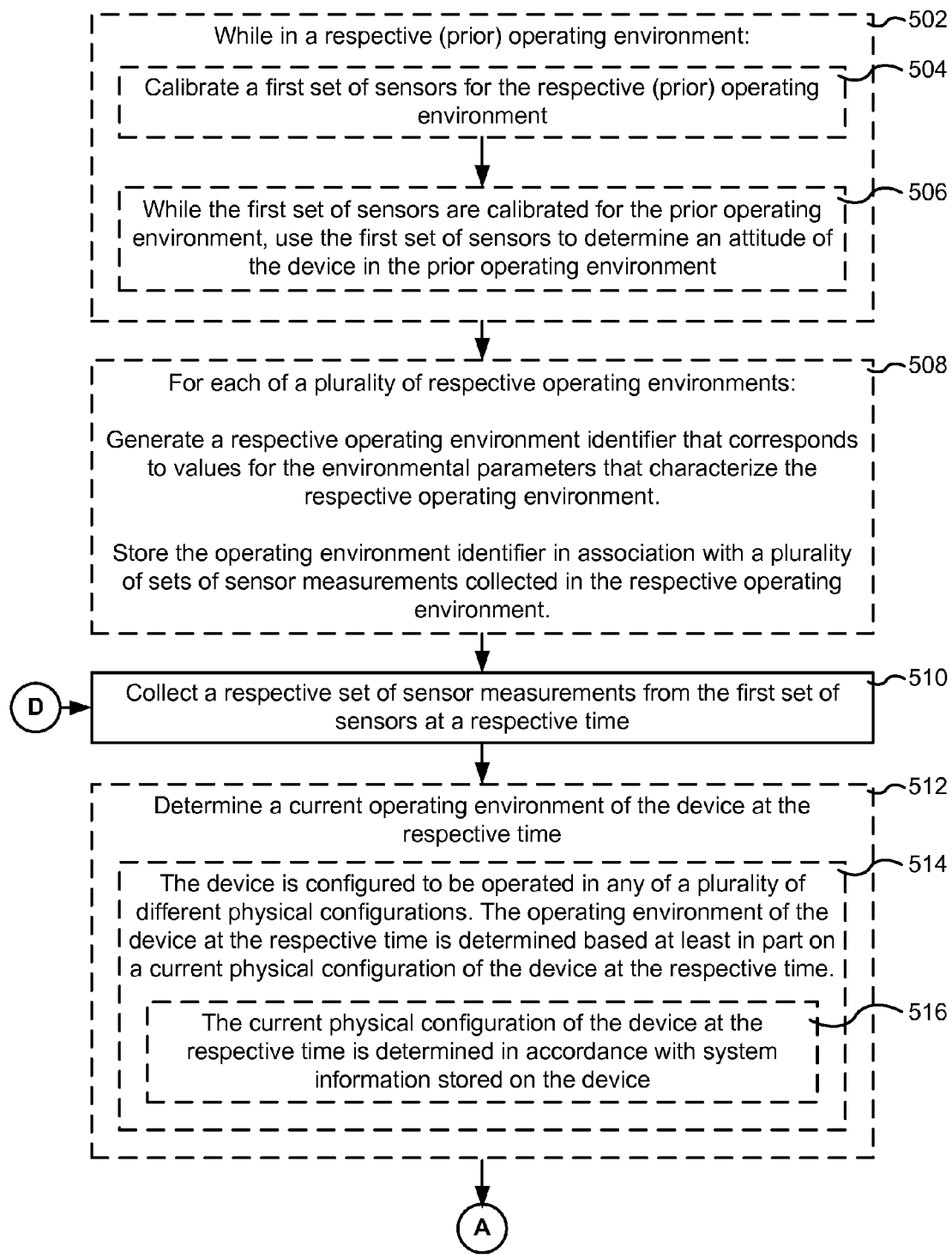
FIGS. 5A-5D are flow diagrams of a method for calibrating sensors of a human interface device in different operating environments, according to some embodiments.
Figure 5B:
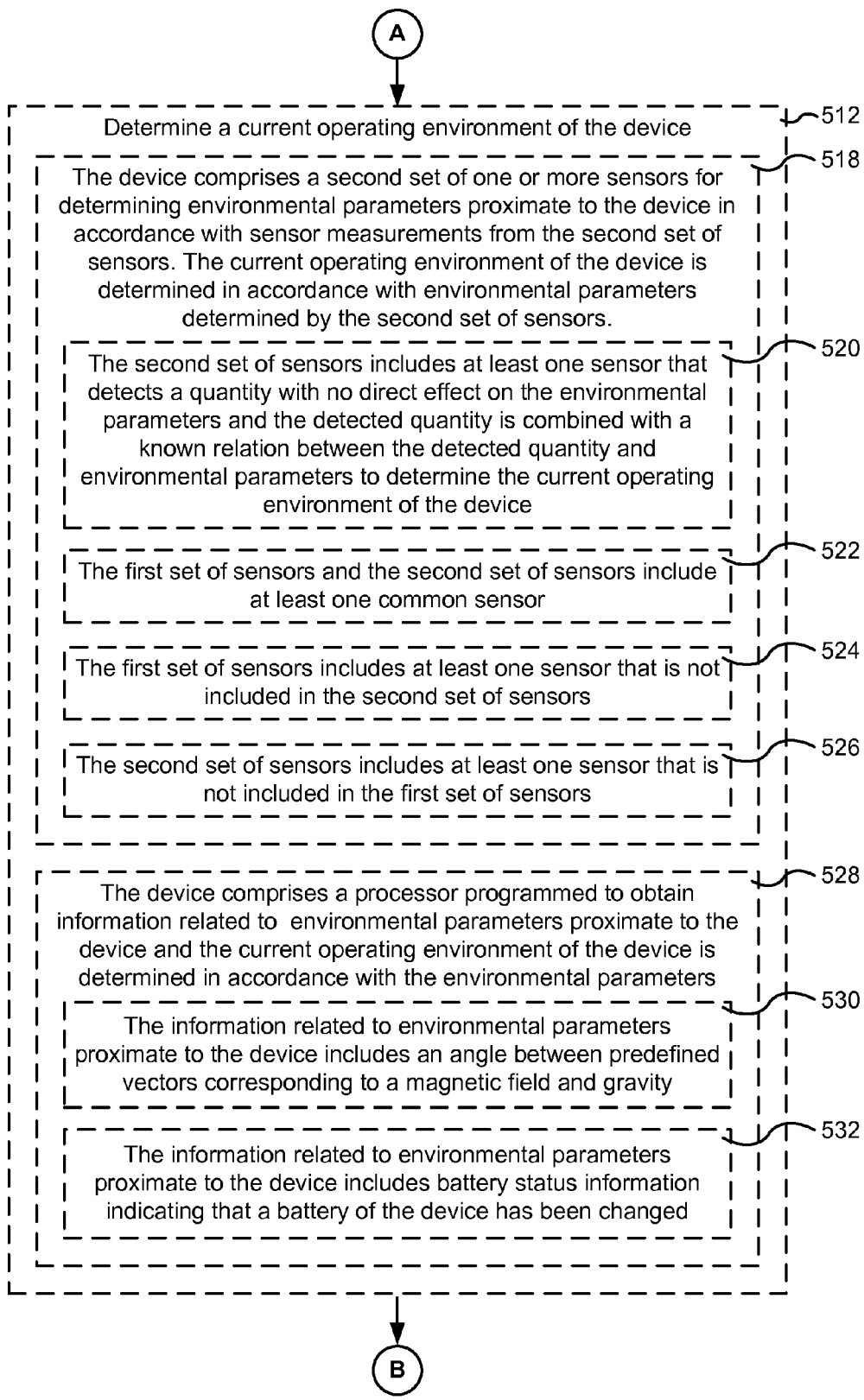
Figure 5C:
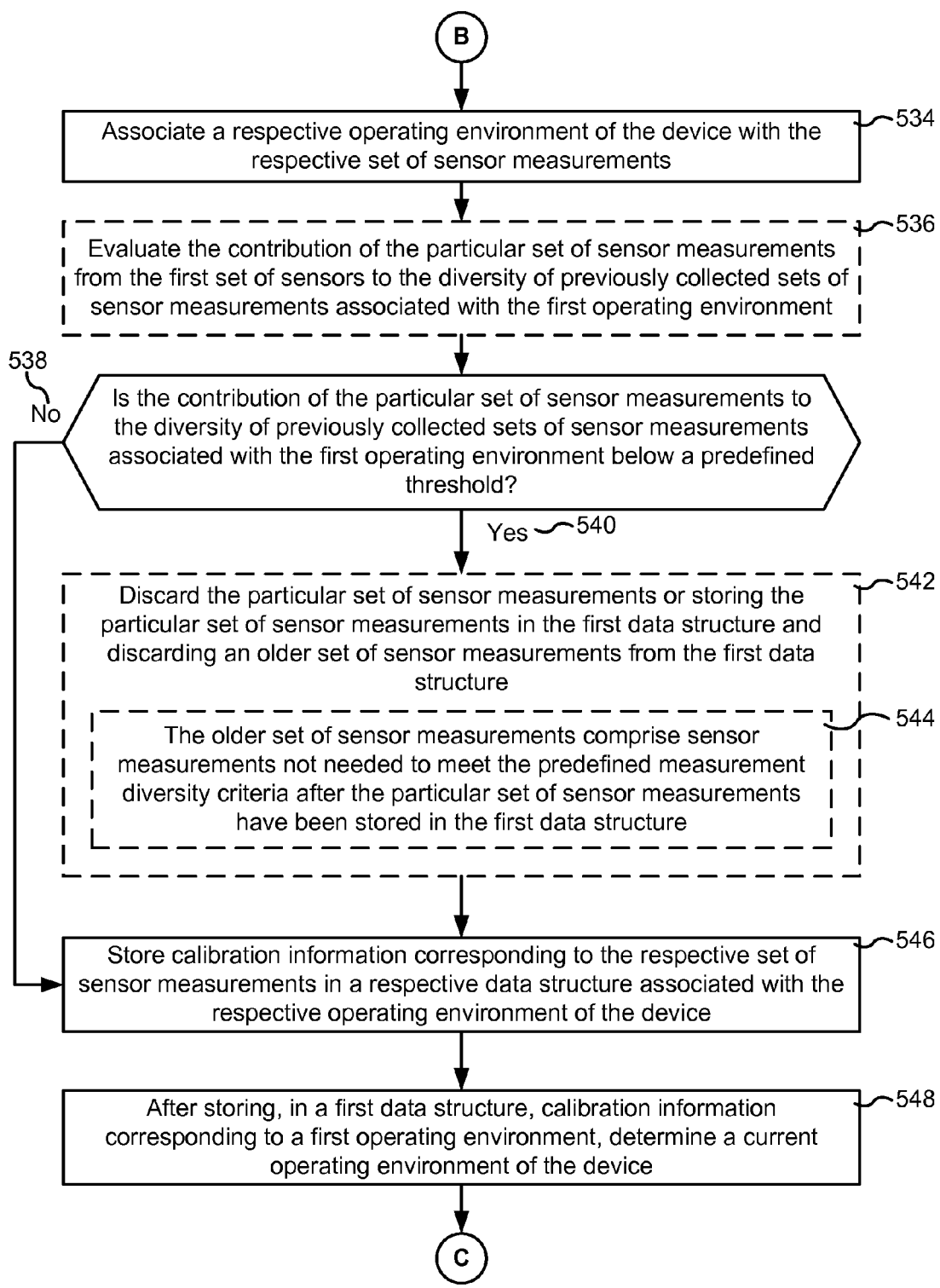
Figure 5D:
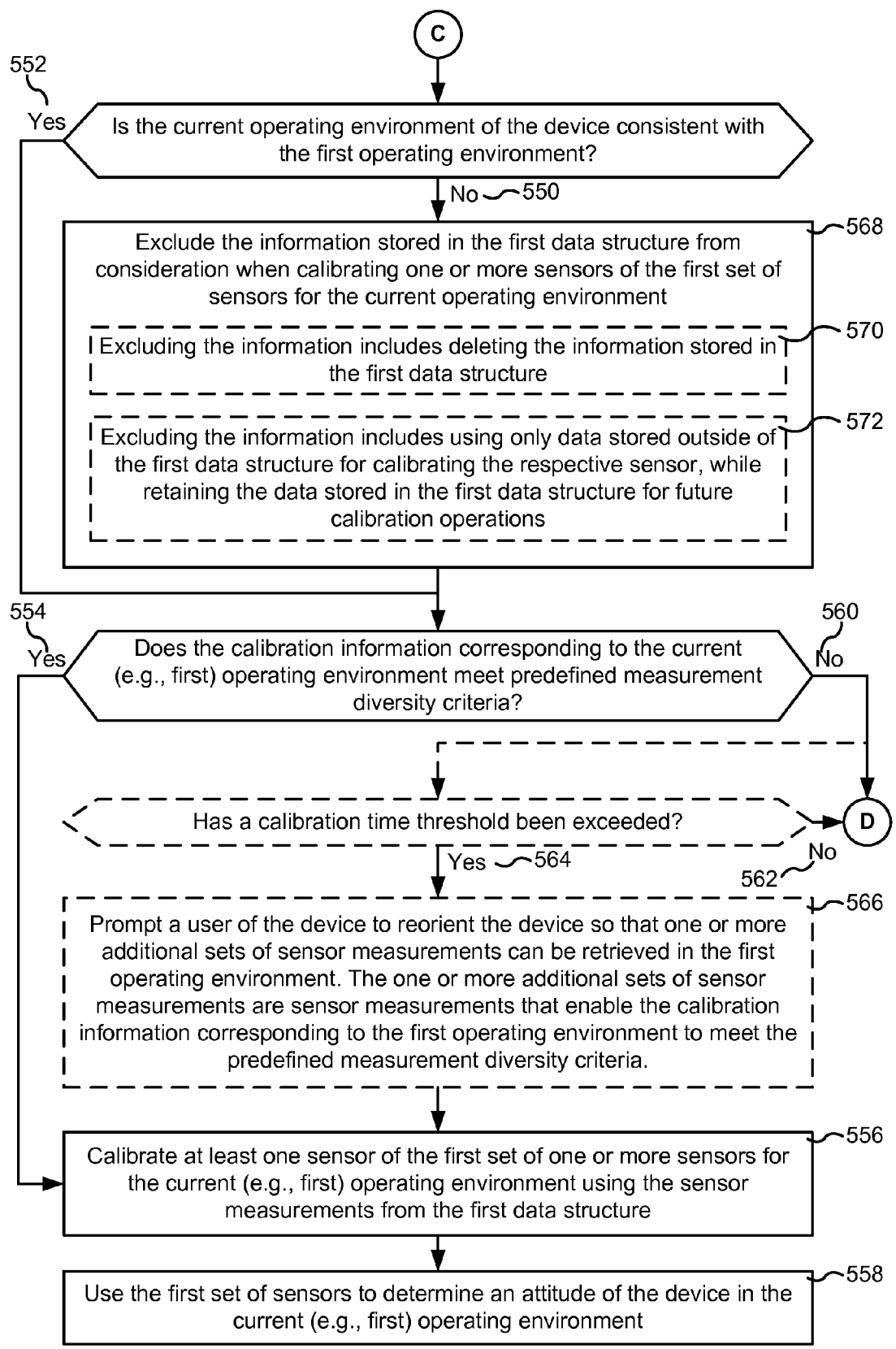

Attention is now directed to FIG. 4, which illustrates an example of collecting sets of sensor measurements in different operating environments, according to some embodiments. In FIG. 4, Device 102 moves from Operating Environment 1 402-1 to Operating Environment 2 402-2 and then moves back and forth between Operating Environment 2 402-2 and Operating Environment 3 402-3 before ending up in Operating Environment 3 402-3. Thus, in FIG. 4, Device 102 is present in three different operating environments between Time=T1 and Time=T9. While Device 102 is in a respective one of the operating environments 402, Device 102 collects respective sets 406 of sensor measurements from three sensors (S1, S2 and S3). In some embodiments, the respective sets of sensor measurements are collected with a timestamp, so that stale sets of sensor measurements can be replaced with fresh sets of sensor measurements as new sets of sensor measurements become available.

In some embodiments, the sets 406 of sensor measurements are collected in accordance with predefined criteria (e.g., a predefined time interval such as every 0.05 seconds, 0.2 seconds, 0.5 seconds, 1 second, 5 seconds or some reasonable interval, or in response to a determination that Device 102 has an attitude that will add diversity to the measurements for the current operating environment). In some embodiments, Device 102 ceases to collect sets 406 of sensor measurements once a sufficient diversity of measurements has been collected. In some embodiments, Device 102 continues to collect Sets 406 of sensor measurements even after a minimum measurement diversity has been reached in order to further increase measurement diversity of the sensor measurements or to keep the Sets 406 of sensor measurements fresh.

In the example illustrated in FIG. 4, Device 102 stores sets 406 of sensor measurements for different operating environments even after Device 102 has left the operating environment, so that sensors of Device 102 can be calibrated using cached sets 406 of sensor measurements if/when Device 102 returns to a prior operating environment. For Example, if Device 102 returned to Operating Environment 1 402-1 after Time=T9, sets of sensor measurements collected in Operating Environment 1 402-1 (e.g., sets 406-1, 406-2 and 406-3) could be used to calibrate sensors of Device 102. Additionally, in this way, Device 102 has sufficient time to collect a sufficient diversity of measurements for operating environments even if Device 102 spends multiple short periods of time in a respective operating environment over the course of a day or week. Thus, in FIG. 4, even though two sets of sensor measurements (e.g., set 406-4 and set 406-5) are stored prior to moving from Operating Environment 2 402-2 to Operating Environment 3 402-3, those sets of sensor measurements are still available when Device 102 returns to Operating Environment 2 402-2 at Time=T7 and can be used in conjunction with an additional set of sensor measurements (e.g., set 406-7) to calibrate sensors in Operating Environment 2 402-2, provided that the sets of sensor measurements meet predefined measurement diversity criteria. Similarly, even though one set of sensor measurements (e.g., set 406-6) is stored prior to moving from Operating Environment 3 402-3 back to Operating Environment 2 402-2, that set of sensor measurements is still available when Device 102 returns to Operating Environment 3 402-3 at Time=T8 and can be used in conjunction with additional sets of sensor measurements (e.g., set 406-8 and set 406-9) to calibrate sensors in Operating Environment 3 402-3, provided that the sets of sensor measurements meet predefined measurement diversity criteria.

Alternatively, in some embodiments, cached sets of sensor measurements are discarded in accordance with predefined criteria, such as discarding sets of sensor measurements that are stale (e.g., more than 1 day, 1 week or 1 month old or some other reasonable time period). In some embodiments, the staleness of a set of sensor measurements from a respective sensor is determined at least in part based on a rate at which sensor measurements from the respective sensor drift over time. For example, for a first sensor (e.g., a magnetometer) that has a relatively low drift rate, sensor measurements of the first sensor are optionally determined to be stale after several hours or days. In contrast, for a second sensor (e.g., a microelectromechanical systems (MEMS) gyroscope) that has a relatively high drift rate relative to the first sensor, sensor measurements of the second sensor are determined to be stale after 5 minutes, 10 minutes, 15 minutes, a half an hour or an hour depending on the rate of drift of the second sensor. In some implementations sets of sensor measurements for operating environments other than the current operating environment and a predefined number of prior operating environments (e.g., one or two prior operating environments) are discarded. Once measurement diversity criteria for the sets of sensor measurements for the current operating environment have been met, Device 102 uses at least some of the sensor measurements to calibrate one or more sensors of Device 102, as described in greater detail below with reference to FIGS. 5A-5D.

Attention is now directed to FIGS. 5A-5D, which illustrate a method 500 for calibrating sensors (e.g., accelerometers and/or magnetometers, etc.) of a human interface device. Method 500 is, optionally, governed by instructions that are stored in a non-transitory computer readable storage medium and that are executed by one or more processors of one or more computer systems (e.g., Device 102, FIG. 8 or Host 101, FIG. 9). Each of the operations shown in FIGS. 5A-5D typically corresponds to instructions stored in a computer memory or non-transitory computer readable storage medium (e.g., Memory 1110 of Device 102 in FIG. 8 or Memory 1210 of Host 101 in FIG. 9). The computer readable storage medium optionally (and typically) includes a magnetic or optical disk storage device, solid state storage devices such as Flash memory, or other non-volatile memory device or devices. The computer readable instructions stored on the computer readable storage medium typically include one or more of: source code, assembly language code, object code, or other instruction format that is interpreted by one or more processors. In various embodiments, some operations in method 500 are combined and/or the order of some operations is changed from the order shown in FIGS. 5A-5D.

Device 102 includes a first set of one or more sensors (e.g., a magnetometer, an accelerometer, a gyroscope, a camera, a barometer, a thermometer and/or a range estimator, etc.). In some embodiments, the first set of sensors includes at least one sensor with environmentally-sensitive calibration. In some embodiments, Device 102 includes means (e.g., a second set of sensors for detecting environmental parameters and/or a processor for lookup of environmental parameters) for determining values of environmental parameters corresponding to an operating environment of Device 102. The means for determining the values of environmental parameters enables Device 102 to associate particular sets of sensor measurements with corresponding operating environments so that the sets of sensor measurements for a current operating environment can be used to calibrate sensors with environmentally-sensitive calibration for the current operating environment, as described in greater detail below.

In some circumstances, while Device 102 is (502) in a prior operating environment, prior to calibrating the first set of sensors for subsequent operating environment (e.g., the first operating environment described in greater detail below), a respective computer system (e.g., Device 102 or Host 101)

calibrates (504) the first set of sensors for the prior operating environment (e.g., an operating environment having a prior set of environmental parameters). While the first set of sensors are calibrated for the prior operating environment, the respective computer system (e.g., Device 102 or Host 101) uses (506) the first set of sensors to determine an attitude of Device 102 in the prior operating environment. In other words, in some circumstances the respective computer system (e.g., Device 102 or Host 101) performs the operations described below to calibrate the first set of sensors in a situation where the first set of sensors are already calibrated for a prior operating environment and the respective computer system (e.g., Device 102 or Host 101) has entered a new operating environment (e.g., the first operating environment) which affects (or has the capacity to affect) the calibration of sensors that have environmentally-sensitive calibration.

In some embodiments, an operating environment corresponds to measurements of one or more of: atmospheric pressure, temperature, magnetic field, focal distance (camera), stereoscopic distance, location (GPS or beacon, Wi-Fi, or cell tower triangulation), and magnetic inclination (or another angle between predefined vectors corresponding to a magnetic field and gravity). In some embodiments, an operating environment is defined as an environment with measurements of a predefined set of environmental characteristics that are within predefined parameters (e.g., atmospheric pressure, temperature and magnetic field readings that are within 1%, 5%, 10% or some reasonable threshold of a baseline value). In other words, an operating environment does not typically correspond to a physical location and thus two or more geographically distinct physical environments (e.g., two climate-controlled office buildings on different sides of the same city) will be a part of the same operating environment if they have similar environmental characteristics as measured by the sensors used to determine environmental parameters. Likewise, two geographically adjacent physical locations (e.g., a location just inside a building and a location outside of the building) can have very different environmental parameters due to variations in temperature, magnetic field, air pressure, etc. Additionally, an operating environment of a particular physical location can change over time if one or more of the environmental parameters changes by more than a predefined threshold amount from a baseline value. However, in many situations a physical location (e.g., a room in a climate controlled office building) will consistently correspond to a particular operating environment.

In some embodiments, for each of a plurality of respective operating environments, the respective computer system (e.g., Device 102 or Host 101) generates (508) a respective operating environment identifier that corresponds to values for the environmental parameters that characterize the respective operating environment and stores the operating environment identifier in association with a plurality of sets of sensor measurements collected in the respective operating environment. Storing the operating environment identifier in association with sets of sensor measurements collected in the respective environment enables the respective computer system (e.g., Device 102 or Host 101) to reuse the sets of sensor measurements collected in the respective operating environment if the same operating environment is detected again at a later point in time. For example, the respective computer system (e.g., Device 102 or Host 101) determines environmental parameters of a current operating environment, compares those determined environmental parameters to environmental parameters stored for previously encountered operating environments. If a respective operating environment of the previously encountered operating environments matches (e.g., is consistent with) the current operating environment, the sets of sensor measurements previously retrieved for the respective operating environment are used to calibrate one or more of the sensors of Device 102.

At each respective time of a plurality of respective times, Device 102 collects (510) a respective set of sensor measurements from the first set of sensors at the respective time, as described in greater detail above with reference to FIG. 4. In some embodiments, in conjunction with collecting the respective set of sensor measurements, the respective computer system (e.g., Device 102 or Host 101) determines (512) a current operating environment of Device 102 and uses the information about the current operating environment of Device 102 to associate the respective set of sensor measurements with the current operating environment of Device 102. In some implementations, the current operating environment of Device 102 is determined periodically and the operating environment associated with a particular set of sensor measurements is the last operating environment that was determined to be the current operating environment of Device 102. In some implementations, the current operating environment of Device 102 is determined based on sensor measurements taken in close temporal proximity (e.g., within 0.1, 0.5, 1 second, 5 seconds, 10 seconds, 30 seconds, 1 minute, 2 minutes or some other reasonable time interval) to the set of sensor measurements.

In some embodiments, Device 102 is configured to be operated in any of a plurality of different physical configurations and the operating environment of Device 102 at a respective time is determined (514) based at least in part on a current physical configuration of Device 102 at the respective time. As one example, Device 102 is a phone that has a sliding/folding lid or keyboard that can be accessed by reconfiguring the phone. These sliding or folding parts can substantially change the operating environment of the sensors in the phone. In some embodiments, the current physical configuration of Device 102 at the respective time is determined (516) in accordance with system information stored on Device 102. For example, a phone (e.g., a mobile or cellular phone) with a slide-out or flip-out keyboard will typically store information indicating a current physical configuration of Device 102 for a variety of system-specific purposes, e.g., for use in determining whether to enable the keyboard to receive inputs or display a keyboard backlight. This information can be retrieved by the sensor calibration modules of the phone to determine whether the operating environment is one of the operating environments where the phone is closed or one of the operating environments where the phone is open.

In some embodiments, Device 102 includes a second set of one or more sensors for determining environmental parameters proximate to Device 102 in accordance with sensor measurements from the second set of sensors. In some implementations, the current operating environment of Device 102 is determined (518) in accordance with environmental parameters determined by the second set of sensors (e.g., measuring temperature, location, magnetic field, atmospheric pressure, etc.). In some of these embodiments, the second set of sensors (sensors used to determine operating environment) include one or more of: a magnetometer, an accelerometer, a gyroscope, a camera, a barometer, a thermometer and a range estimator. In other words, in some embodiments, the second set of sensors includes at least some of the same sensors as the first set of sensors.

In particular, in some embodiments, the second set of sensors includes (520) at least one sensor that detects a quantity with no direct effect on the environmental parameters and the detected quantity is combined with a known relation between the detected quantity and environmental parameters to determine the current operating environment of Device 102 (e.g., battery replacement/charge state information is used to generate an approximate magnetic field change). In some implementations, the first set of sensors and the second set of sensors include (522) at least one common sensor (e.g., a multi-dimensional magnetometer is used to determine a current operating environment of Device 102 and is calibrated using sets of sensor measurements from the first set of sensors). In some implementations, the first set of sensors includes (524) at least one sensor that is not included in the second set of sensors (e.g., a multi-dimensional accelerometer is calibrated using the sets of sensor measurements from the first set of sensors but is not used to determine environmental parameters of the current operating environment). In some implementations, the second set of sensors includes (526) at least one sensor that is not included in the first set of sensors (e.g., a thermometer is used to determine a temperature of the current operating environment but is not calibrated using the sets of sensor measurements).

In some embodiments the respective computer system (e.g., Device 102 or Host 101) includes a processor programmed to obtain information related to environmental parameters proximate to Device 102 and the current operating environment of Device 102 is determined (528) in accordance with the environmental parameters. In some embodiments, the information related to environmental parameters proximate to Device 102 includes (530) an angle between predefined vectors corresponding to a magnetic field and gravity, sometimes called an "angle of inclination" or a "G-H angle." In some embodiments, the angle of inclination is obtained by table lookup (e.g., based on a position on earth position from a Global Positioning System or otherwise, or a dead reckoning computation based on magnetometer and accelerometer measurements or other sensor measurements. For example, the respective computer system (e.g., Device 102 or Host 101) determines a current position of Device 102 on the Earth (e.g., latitude, longitude and altitude) and uses the determined position to look up (or retrieve from a remote source) a corresponding angle of inclination corresponding to an estimated or previously measured angle between the Earth's magnetic field and the Earth's gravitational field at the current position of Device 102.

In some embodiments, the information related to environmental parameters proximate to Device 102 includes (532) battery status information indicating that a battery of Device 102 has been changed. For example, when a battery of Device 102 is changed, the new battery may have a very different effect on an operating environment of Device 102 than a previous battery. In some implementations, replacement of a battery of Device 102 is detected directly by a sensor that monitors battery changes. In some implementations, replacement of a battery of Device 102 is detected indirectly by one or more sensors that monitor operating parameters (e.g., voltage, resistance, maximum charge capacity, charge time, etc.) of the battery and determine that a battery of Device 102 has been replaced when one or more of these operating parameters of the battery changes beyond a range of normal variation. For example, if a maximum charge capacity of a battery dramatically increases (e.g., by more than 10%), it is likely that the battery has been changed, as the maximum charge capacity of a rechargeable battery typically degrades over time. Additionally, it should be understood that in many situations when a change in operating environment of Device 102 is due to a change to a component of Device 102 (e.g., replacement of a battery of Device 102), the change in operating environments will invalidate multiple different sets of sensor measurements from multiple different operating environments (e.g., because the effect of the replacement battery is present in each of the different operating environments).

After collecting the respective set of sensor measurements, the respective computer system (e.g., Device 102 or Host 101) associates (534) a respective operating environment of Device 102 with the respective set of sensor measurements. In some embodiments, prior to associating the respective operating environment with the respective set of sensor measurements, Device 102 determines the current operating environment of Device 102, and the respective operating environment is the current operating environment at the respective time that the respective set of sensor measurements are collected. In some embodiments, the respective operating environment is determined by Device 102 in accordance with values of environmental parameters detected at the respective time.

In some embodiments, after collecting, from the first set of sensors, a particular set of sensor measurements associated with the first operating environment, the respective computer system (e.g., Device 102 or Host 101) evaluates (536) the contribution of the particular set of sensor measurements from the first set of sensors to the diversity of previously collected sets of sensor measurements associated with the first operating environment. In some embodiments, after evaluating the contribution of the set of sensor measurements to diversity of the sets of sensor measurements, Device 102 determines whether the contribution of the particular set of sensor measurements to the diversity of previously collected sets of sensor measurements associated with the first operating environment is below a predefined threshold. In accordance with a determination that the contribution of the particular set of sensor measurements to the diversity of previously collected sets of sensor measurements associated with the first operating environment is (538) above (i.e., is not below) a predefined threshold, the respective computer system (e.g., Device 102 or Host 101) proceeds to store calibration information corresponding to the respective set of sensor measurements (as described with reference to operation 546 below) without discarding sets of sensor measurements for the first operating environment. In some embodiments, calibration information corresponds to representations of a plurality of sets of sensor measurements and associated timestamps, such as the information stored in Calibration Caches 404 described above with reference to FIG. 4.

In contrast, in accordance with a determination that the contribution of the particular set of sensor measurements to the diversity of previously collected sets of sensor measurements associated with the first operating environment is (540) below the predefined threshold, the respective computer system (e.g., Device 102 or Host 101) discards (542) the particular set of sensor measurements or stores the particular set of sensor measurements in the first data structure and discards an older set of sensor measurements from the first data structure. In some embodiments, the older set of sensor measurements comprise (544) sensor measurements not needed to meet the predefined measurement diversity criteria after the particular set of sensor measurements have been stored in the first data structure. In other words, if a new set of sensor measurements is collected and the new set of sensor measurements is effectively a duplicate of an older set of sensor measurements, the older "stale" set of sensor measurements are discarded in favor of the new "fresh" set of sensor measurements.

Thus, in some embodiments, sets of sensor measurements in a calibration cache for a particular operating environment are managed so that sets of sensor measurements in the cache that do not add to measurement diversity are not stored, thereby reducing the amount of information stored in the calibration caches, thereby conserving storage space. For example, when two magnetometer measurements are taken at different times in the same operating environment with Device 102 in the same or similar orientation with respect to the Earth's magnetic field, the two magnetometer measurements will both provide the same or similar information for use in calibrating the magnetometer. Thus retaining either of these sensor measurements will provide the same contribution to measurement diversity as both of these sensor measurements. As such, retaining one of the sensor measurements (e.g., the sensor measurement with less error or the more recent sensor measurement) while the other sensor measurement is discarded to make room for other sensor measurements that do add to the measurement diversity reduce the storage space used by data in the calibration cache without meaningfully reducing the measurement diversity of the sets of sensor measurements.

After generating the respective set of sensor measurements, the respective computer system (e.g., Device 102 or Host 101) stores (546) calibration information corresponding to the respective set of sensor measurements in a respective data structure (e.g., a calibration cache 404) associated with the respective operating environment of Device 102. In some embodiments, after storing, in a first data structure, calibration information corresponding to a first operating environment, the respective computer system (e.g., Device 102 or Host 101) determines (548) a current operating environment of Device 102.

After determining the current operating environment of Device 102, the respective computer system (e.g., Device 102 or Host 101) determines whether the current operating environment of Device 102 is consistent with the first operating environment. In accordance with a determination that the current operating environment of Device 102 is not (550) consistent with the first operating environment, the cached sets of sensor measurements for the first operating environment are not used to calibrate sensors of Device 102 (as the set of sensor measurements associated with the first operating environment were not collected in the current operating environment and thus will not necessarily produce an accurate calibration for the current operating environment), as described in greater detail below with reference to operations 562-566. In contrast, in accordance with a determination that the current operating environment of Device 102 is (552) consistent with the first operating environment, the respective computer system (e.g., Device 102 or Host 101) determines whether the calibration information corresponding to the first operating environment meets predefined measurement diversity criteria. In the example described above, at the point in time that the determination described above with reference to step 552 is made, the first operating environment is the current operating environment of Device 102. However, if the current operating environment were a different respective operating environment, Device 102 would determine whether the calibration information corresponding to the respective operating environment meets the predefined measurement diversity criteria.

In some embodiments, the predefined measurement diversity criteria include one or more spatial orientation diversity criteria (e.g., the measurement diversity criteria specify that the sets of measurements include measurements taken while Device 102 is in three substantially orthogonal orientations or a larger number of orientations that are not mutually orthogonal but provide a similar diversity of information). In some embodiments, the predefined measurement diversity criteria include one or more spatial position diversity criteria (e.g., the measurement diversity criteria specify that the sets of measurements include measurements taken while Device 102 is at different locations within a particular operating environment). In some embodiments, the predefined measurement diversity criteria include one or more non-inertial frame of reference diversity criteria (e.g., the measurement diversity criteria specify that the sets of measurements include measurements taken while Device 102 is rotating or accelerating at different rates in a particular operating environment). In some embodiments, the predefined measurement diversity criteria include one or more inertial frame of reference diversity criteria (e.g., the measurement diversity criteria specify that the sets of measurements include measurements taken while Device 102 is moving at different speeds without acceleration). In some embodiments, the measurement diversity criteria include quality criteria (e.g., fewer measurements are needed if the data is of higher quality or if multiple types of data are available to compare).

In accordance with a determination that the current operating environment of Device 102 is consistent with (e.g., not inconsistent with) the first operating environment and that the calibration information corresponding to the first operating environment meets (554) predefined measurement diversity criteria, the respective computer system (e.g., Device 102 or Host 101) calibrates (556) at least one sensor of the first set of one or more sensors for the first operating environment using the sensor measurements from the first data structure. After the first set of sensors have been calibrated for the first operating environment, the respective computer system (e.g., Device 102 or Host 101) uses (558) the first set of sensors to determine an attitude of Device 102 in the first operating environment.

In accordance with a determination that the calibration information corresponding to the current operating environment (e.g., the first operating environment, which is the current operating environment when Device 102 is in the first operating environment) does not (560) meet predefined measurement diversity criteria, the respective computer system (e.g., Device 102 or Host 101) proceeds to take additional steps to calibrate one or more sensors in the first set of sensors. In some embodiments, the additional steps to calibrate one or more sensors in the first set of sensors include collecting one or more additional sets of sensor measurements in the current operating environment (e.g., by returning to operation 510 or by prompting a user to reorient Device 102). In some embodiments, the additional steps to calibrate the one or more sensors in the first set of sensors include calibrating the one or more sensors in the first set of sensors without waiting for additional sets of sensor measurements to be collected (e.g., because a calibration time threshold has been exceeded).

In some embodiments, prior to returning to operation 510, the respective computer system (e.g., Device 102 or Host 101) determines whether a calibration time threshold has been exceeded. In accordance with a determination that a calibration time threshold has not (562) been exceeded, the respective computer system (e.g., Device 102 or Host 101) proceeds to collect additional sets of sensor measurements in the current operating environment either by returning to operation 510. However, in some implementations, in accordance with a determination that: the current operating environment of Device 102 is consistent with the first operating environment, the calibration information corresponding to the first operating environment does not meet the predefined measurement diversity criteria, and a calibration time threshold has (564) been exceeded, the respective computer system (e.g., Device 102 or Host 101) prompts (566) a user of Device 102 to reorient Device 102 so that one or more additional sets of sensor measurements can be retrieved in the first operating environment. In some embodiments, the one or more additional sets of sensor measurements are sensor measurements that enable the calibration information corresponding to the first operating environment to meet the predefined measurement diversity criteria. After the one or more additional sets of sensor measurements have been retrieved, if Device 102 is still in the first operating environment, the respective computer system (e.g., Device 102 or Host 101) calibrates (556) at least one sensor of the first set of one or more sensors for the first operating environment using the sensor measurements from the first data structure. In other words, while collection of sets of sensor measurements to be used in calibrating sensors of Device 102 can typically be carried out in the background as a user moves Device 102 in the normal course of operating Device 102, in some situations, the user will not move Device 102 in a way that provides sufficient measurement diversity and thus user can be prompted to move Device 102 in a way that will enable sets of sensor measurements to be collected so that the respective computer system (e.g., Device 102 or Host 101) can complete the calibration of one or more of the sensors of Device 102.

In some circumstances it is advantageous to calibrate sensors with incomplete calibration information because, in many situations, calibration of sensors with incomplete calibration information will provide more accurate sensor measurements than using uncalibrated sensors or sensors that are calibrated for a different operating environment. As such, in some embodiments, in accordance with a determination that: the current operating environment of Device 102 is consistent with the first operating environment, the calibration information corresponding to the first operating environment does not meet the predefined measurement diversity criteria, and a calibration time threshold has been exceeded, the respective computer system (e.g., Device 102 or Host 101) calibrates (556) at least one sensor of the first set of one or more sensors for the first operating environment using the sensor measurements from the first data structure. In the example described above, at the point in time that the determination described above with reference to step 556 is made, the first operating environment is the current operating environment of Device 102. In other words, in some implementations, after Device 102 has been in a respective operating environment for more than a predefined time period, measurement diversity requirements are reduced for the respective operating environment even if the calibration information for the respective operating environment does not meet the initial predefined measurement diversity criteria, so that sensors of Device 102 can be calibrated with the available information.

In some situations, prior to calibrating the first set of sensors for the first operating environment, the first set of sensors are calibrated for a prior operating environment having a prior set of environmental parameters and while the first set of sensors are calibrated for the prior operating environment, the respective computer system (e.g., Device 102 or Host 101) uses the first set of sensors to determine an attitude of Device 102 in the prior operating environment. Subsequently, after calibrating the first set of sensors (e.g., calibrating the first set of sensors for the first operating environment or the second operating environment), the respective computer system (e.g., Device 102 or Host 101) uses (558) the first set of sensors to determine an attitude of Device 102 in the first operating environment, as described in greater detail above. In other words, when Device 102 is in different operating environments, one or more sensors of Device 102 are calibrated using different sets of sensor measurements collected in different operating environments. In many circumstances, calibrating sensors for particular operating environments improves the accuracy and/or reduces error in measurements collected from the sensors so that information generated based on sensor measurements from the calibrated sensors is more accurate. For example, when sensor measurements from the first set of sensors are used to determine an attitude of Device 102, attitude determinations using sensors calibrated using operating-environment-specific calibrations for the current operating environment will typically be much more accurate than attitude determinations using sensors calibrated using an operating-environment-independent (e.g., generic) calibration or using an operating-environment-specific calibrations for an operating environment other than the current operating environment.

For example in a situation where metal girders of a building have become magnetized, a generically calibrated system would likely either fail to notice the magnetic distortion and would consequently produce inaccurate results that were skewed by the magnetic distortion or, alternatively, would notice the magnetic distortion and cease to use the magnetometer, and thus suffer a decrease in accuracy caused by the inability to use the magnetometer in navigational state determination operations. In some situations the generically calibrated device would be adversely affected within 10 minutes or sooner, while a device calibrated for the operating environment including the magnetic disturbance would be able to continue operating for an extended period of time (e.g., hours or days) in the operating environment with the magnetic disturbance without experiencing the loss in accuracy suffered by the generically calibrated device.

In some embodiments, the respective computer system (e.g., Device 102 or Host 101) determines that a change in the operating environment is a transient change (e.g., due detection of a sudden large sensor value change that is unlikely to have been caused by sensor drift) and ignores the change (e.g., stops storing sets of sensor data for a predetermined amount of time) until the change is reversed or is determined to be non-transient (e.g., the change persists for longer than the predetermined amount of time). For example, an operating environment in an elevator may have substantially different magnetic characteristics than an operating environment outside of the elevator, however Device 102 will typically be in the elevator for a relatively short period of time (e.g., less than 5 minutes) and thus it would be a waste of computing resources to attempt to calibrate one or more sensors of Device 102 while Device 102 is in the elevator. Similarly, temporary close proximity to a large metallic or strongly magnetic object could also cause changes to a magnetic field around Device 102. In many situations, ignoring sensor measurements generated by transient changes in an operating environment of Device 102 is also advantageous because potentially erroneous sets of sensor measurements are ignored and thus are prevented from skewing sensor calibrations.

While the above described steps are performed when the current operating environment is consistent with the first operating environment, in some circumstances the current operating environment will not be consistent with the first operating environment (e.g., because Device 102 has been physically relocated to a new location with a different operating environment or environmental parameters in a current location such as temperature or device configuration have changed so that the operating environment of Device 102 has changed). In accordance with a determination that the current operating environment of Device 102 is inconsistent (550) with (e.g., different from) the first operating environment, the respective computer system (e.g., Device 102 or Host 101) excludes (568) the information stored in the first data structure from consideration when calibrating one or more sensors of the first set of sensors for the current operating environment. In some embodiments, the first set of sensors is calibrated in the second operating environment by repeating the process described above for calibrating the first set of sensors in the first operating environment. For example, if the current operating environment is a second operating environment, the respective computer system (e.g., Device 102 or Host 101) collects sensor measurements that meet the predefined measurement diversity criteria and calibrates one or more of the sensors using the sensor measurements collected in the second operating environment.

In some embodiments, excluding the information stored in the first data structure from consideration when calibrating one or more sensors of the first set of sensors for the current operating environment includes deleting (570) the information stored in the first data structure (e.g., flushing a calibration cache for the first operating environment). In some embodiments, excluding the information stored in the first data structure from consideration when calibrating a respective sensor of the first set of sensors for the current operating environment includes using (572) only data stored outside of the first data structure for calibrating the respective sensor (e.g., using data stored in a data structure such as a calibration cache associated with the current operating environment of Device 102), while retaining the data stored in the first data structure for future calibration operations (e.g., the first calibration cache is retained for future use if Device 102 returns to the first operating environment).

It should be understood that the particular order in which the operations in FIGS. 5A-5D have been described are merely exemplary and are not intended to indicate that the described order is the only order in which the operations could be performed. One of ordinary skill in the art would recognize various ways to reorder the operations described herein. Additionally, it should be noted that details of other processes described herein with respect to method 700 (e.g., FIGS. 7A-7B) are also applicable in an analogous manner to method 500 described above with respect to FIGS. 5A-5D. For example, the sensors and calibration operations described above with reference to method 500 may have one or more of the characteristics of the various sensors and calibration operations described herein with reference to method 700. For brevity, these details are not repeated here.

Generating Output Data

Figure 6:
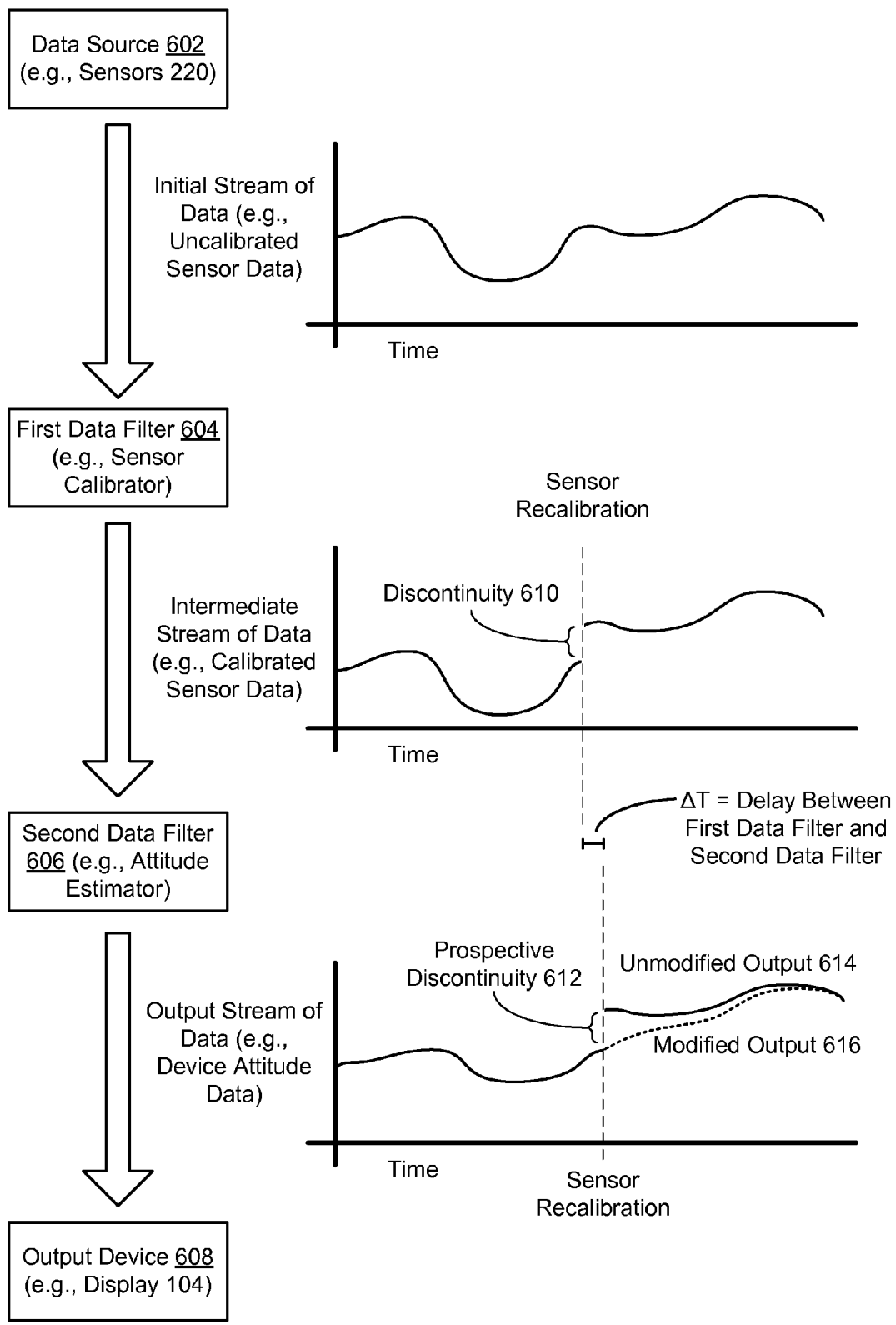
FIG. 6 is a diagram illustrating an example of adjusting a data filter so as to compensate for a discontinuity in input data, according to some embodiments.

Attention is now directed to FIG. 6, which illustrates an example of adjusting a data filter so as to compensate for a discontinuity in input data, according to some embodiments. In the example shown in FIG. 6, Data Source 602 (e.g., a sensor or set of sensors of Device 102) provides an initial stream of data (e.g., uncalibrated sensor data from the sensor or set of sensors of Device 102). First Data Filter 604 (e.g., a sensor calibrator such as Sensor Calibrator 1142 in FIG. 8 or Sensor Calibrator 1242 in FIG. 9) converts the initial stream of data to an intermediate stream of data (e.g., calibrated sensor data). Second Data Filter 606 (e.g., an attitude estimator such as Device Attitude Estimator 1144 in FIG. 8 or Device Attitude Estimator 1244 in FIG. 9) uses the intermediate stream of data (e.g., the calibrated sensor data) to generate an output stream of data (e.g., device attitude data for Device 102). Output Device 608 (e.g., Display 104) uses the output stream to control a user interface. For example if Output Device 608 includes Display 104, the output stream of data can be used to determine a position of a cursor on a display.

In FIG. 6, Data Source 602 produces an initial stream of data over time. As this initial stream of data is produced a First Data Filter 604 generates calibrated sensor data based on the initial stream of data. However, when a calibration of the sensors changes (e.g., because the sensors are recalibrated based on new sets of sensor measurements and/or a new calibration that is based on a change in operating environment of Device 102), there will, in many circumstances, be a discontinuity 610 (e.g., a break in a continuous function such as Discontinuity 610 shown in FIG. 6) that is introduced into the intermediate steam of data. For example, output of a magnetometer can generally be represented as a continuous function over time. However, if the magnetometer is determined to have a different rotational offset about one axis in a new calibration as compared to a rotational offset about the axis in a prior calibration, recalibrating the magnetometer will most likely introduce a sudden change or discontinuity in the calibrated output of the magnetometer where there is a sudden jump in the calibrated magnetometer data. Calibrated sensor data is more accurate when sensors are accurately calibrated, and thus it is advantageous to recalibrate sensors frequently. However, if recalibration of a sensor results in a discontinuity in data output to a user of Device 102, frequent recalibrations will cause the data output to the user to be erratic and jittery and will degrade the user experience. Thus, in some implementations, it is advantageous to reduce jitter caused by recalibrating sensors of Device 102 and effectively conceal the changes in calibration of sensors of the Device 102 from the user.

One approach to reducing jitter caused by recalibration of sensors is to modify a filter that converts the calibrated sensor data into output data (e.g., device attitude data) that is provided directly or indirectly to the user so as to remove prospective discontinuities from the output data. For example, if there is a delay $\Delta T$ between when intermediate data is output by First Data Filter 604 (e.g., a sensor calibrator) and when the intermediate data is processed by Second Data Filter 606 (e.g., a device attitude estimator), the first data filter sends a signal to the second data filter to indicate that there is discontinuity in the intermediate stream of data that will, if uncorrected cause a prospective discontinuity (e.g., Prospective Discontinuity 612) in the output data. The delay $\Delta T$ enables Second Data Filter 606 to determine a modification that will compensate for Discontinuity 610 in the intermediate data stream while still taking the new calibration sensors into account. In other words, if Device 102 determines that a discontinuity in the intermediate stream of data will cause a Prospective Discontinuity 612 in the output stream of data, Second Data Filter 606 is modified to remove or reduce this Prospective Discontinuity 612.

For example in FIG. 6, instead of providing the user with Unmodified Output 614, which includes Prospective Discontinuity 612, Second Data Filter 606 produces Modified Output 616, which removes or reduces Prospective Discontinuity 612 from the output stream of data. In this example, Unmodified Output 614 corresponds to output data that corresponds to the calibrated sensor data and thus is accurate with respect to the calibrated sensor data. In contrast, in this example, Modified Output 616 corresponds to output data that is adjusted from the unmodified data to provide a continuous set of output data and thus is (at least temporarily) less accurate than Unmodified Output 614 with respect to the calibrated sensor data. However, while the Modified Output 616 is (at least temporarily) less accurate with respect to the calibrated sensor data than Unmodified Output 614, in some implementations, the Modified Output 616 is calculated so as to converge on Unmodified Output 614, so that any difference in accuracy between the two outputs with respect to the calibrated sensor data is only temporary. The modification to Second Data Filter 606 could be performed using any of a variety of techniques. For example, a modification term that adjusts Unmodified Output 614 to Modified Output 616 at the point where the sensor recalibration would have created Prospective Discontinuity 612 can be reduced over time (e.g., by multiplying the modification term by a weighting factor that gradually becomes zero over a predefined time interval).

In some embodiments, the difference between the unmodified output 614 and the modified output 616 is referred to as the output error. This output error can be reduced over time in a variety of ways. For example, a rate at which the error is reduced is optionally a linear or a non-linear function of the change in the output, so that a larger amount of error correction is performed when the rate of change of the output has a greater magnitude in a direction corresponding to the direction of the error (e.g., as opposed to a direction orthogonal to the direction of the error). Alternatively or in addition to gradually reducing the output error over time, the output error can be reduced by a large amount (or reduced to zero) when the user is not paying attention (e.g., when the backlight of the device has been turned off or at another time when the device otherwise determines that the user is unlikely to detect a sudden discontinuity in output caused by a change in the output stream). Thus, in some embodiments, the prospective discontinuity is hidden from the user by shifting the timing of the discontinuity to a time a when it is unlikely to be noticed by the user (e.g., the prospective discontinuity is shifted from a first time corresponding to the time at which the sensor recalibration occurred to a second time after the first time).

Figure 7A:
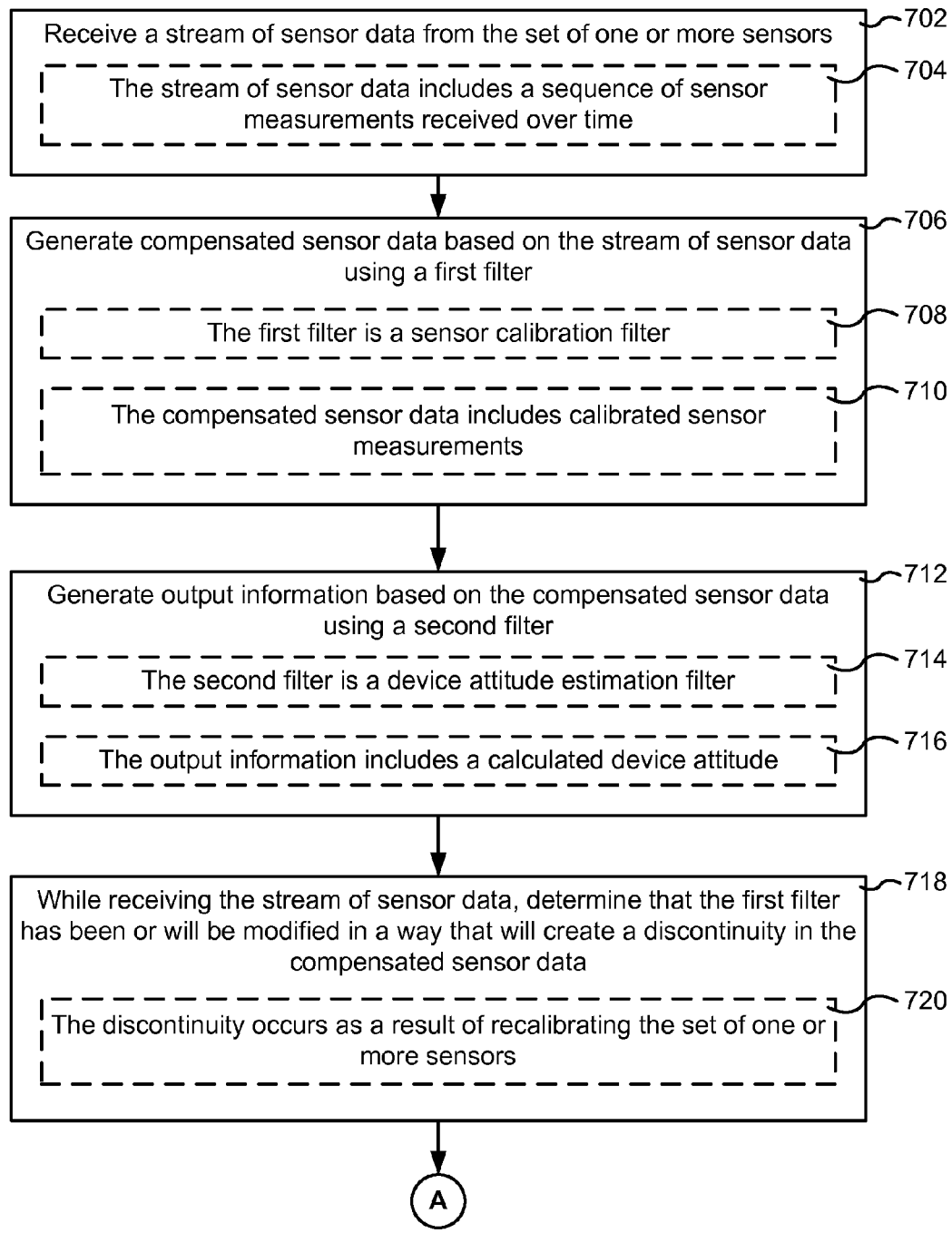
FIGS. 7A-7B are flow diagrams of a method for adjusting a data filter so as to compensate for a discontinuity in input data, according to some embodiments.
Figure 7B:
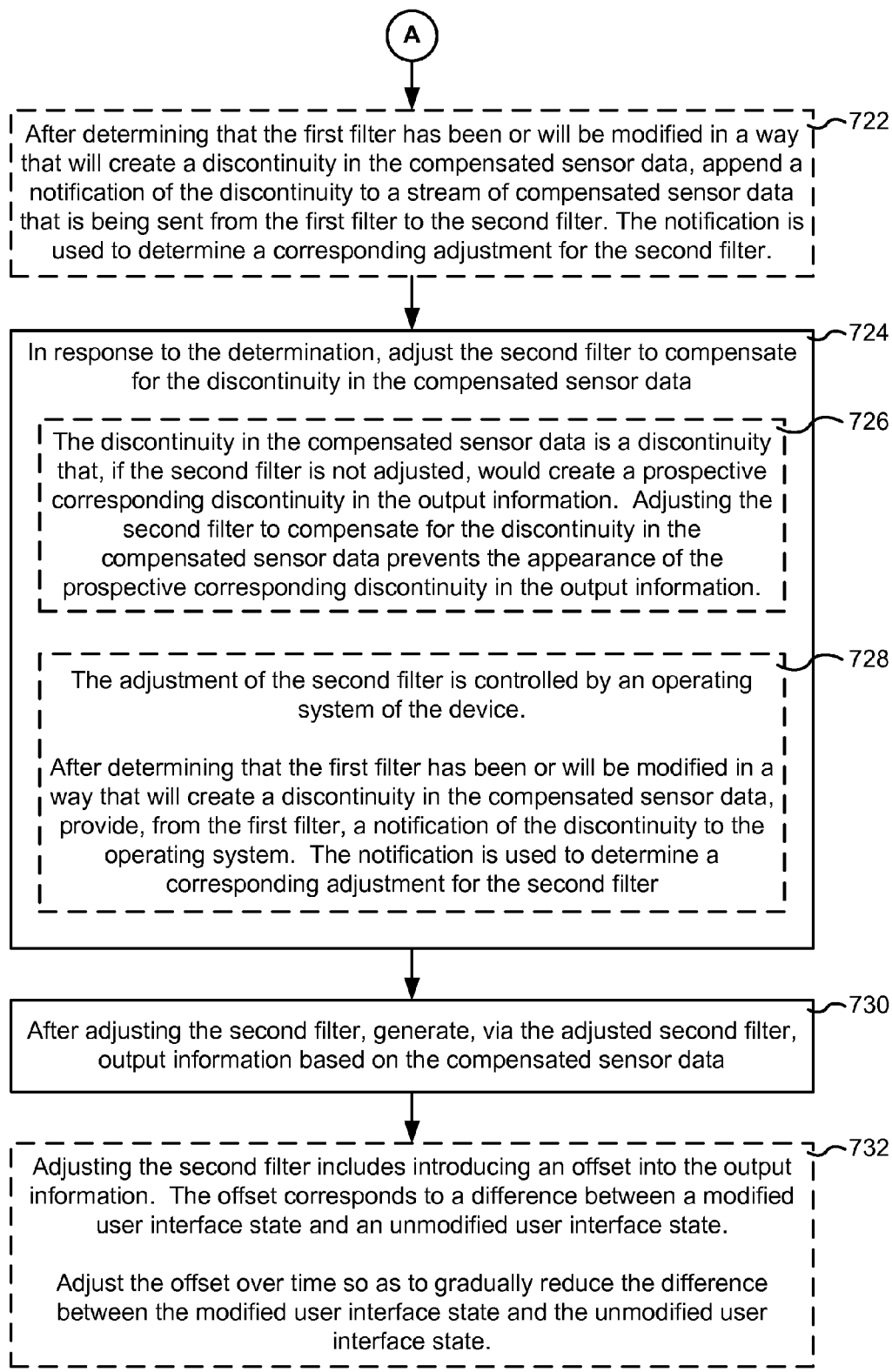

Attention is now directed to FIGS. 7A-7B, which illustrate a method 700 for calibrating sensors (e.g., accelerometers and/or magnetometers) of a human interface device. Method 700 is, optionally, governed by instructions that are stored in a non-transitory computer readable storage medium and that are executed by one or more processors of one or more computer systems (e.g., Device 102, FIG. 8 or Host 101, FIG. 9). Each of the operations shown in FIGS. 7A-7B typically corresponds to instructions stored in a computer memory or non-transitory computer readable storage medium (e.g., Memory 1110 of Device 102 in FIG. 8 or Memory 1210 of Host 101 in FIG. 9). The computer readable storage medium optionally (and typically) includes a magnetic or optical disk storage device, solid state storage devices such as Flash memory, or other non-volatile memory device or devices. The computer readable instructions stored on the computer readable storage medium typically include one or more of: source code, assembly language code, object code, or other instruction format that is interpreted by one or more processors. In various embodiments, some operations in method 700 are combined and/or the order of some operations is changed from the order shown in FIGS. 7A-7B.

A respective computer system (e.g., Device 102 or Host 101) receives (702) a stream of sensor data from the set of one or more sensors. In some embodiments, the stream of sensor data includes (704) a sequence of sensor measurements received over time. The respective computer system (e.g., Device 102 or Host 101) generates (706) compensated sensor data based on the stream of sensor data using a first filter. In some embodiments, the first filter is (708) a sensor calibration filter (e.g., Sensor Calibrator 1142 in FIG. 8 or Sensor Calibrator 1242 in FIG. 9). In some embodiments, the compensated sensor data includes (710) calibrated sensor measurements (e.g., sensor measurements calibrated in accordance with an operational environment dependent calibration, as described in greater detail above with reference to FIGS. 5A-5D). The respective computer system (e.g., Device 102 or Host 101) generates (712) output information based on the compensated sensor data using a second filter. In some embodiments, the second filter is (714) a device attitude estimation filter (e.g., Device Attitude Estimator 1144 in FIG. 8 or Device Attitude Estimator 1244 in FIG. 9). In some embodiments, (e.g., where the stream of sensor data includes a sequence of sensor measurements received over time and the compensated sensor data includes calibrated sensor measurements) the output information includes (716) a calculated device attitude (e.g., position and/or orientation).

While receiving the stream of sensor data (e.g., from one or more Sensors 220), the respective computer system (e.g., Device 102 or Host 101) determines (718) that the first filter has been or will be modified in a way that will create a discontinuity in the compensated sensor data. In some embodiments, the discontinuity occurs (720) as a result of recalibrating the set of one or more sensors (e.g., due to a change in the operating environment of Device 102, a detected error condition or a request from a user to recalibrate the one or more sensors).

In some embodiments, after determining that the first filter has been or will be modified in a way that will create a discontinuity in the compensated sensor data, the respective computer system (e.g., Device 102 or Host 101) appends (722) a notification of the discontinuity to a stream of compensated sensor data that is being sent from the first filter to the second filter. In some implementations the notification is used to determine a corresponding adjustment for the second filter. In some embodiments, the notification is appended to the data stream at a location that corresponds to the discontinuity (e.g., at the discontinuity or at a location some predefined amount of time prior to the discontinuity). In some embodiments, the notification is posted for use by either the second filter, or a manager of the second filter, to determine the adjustment to the second filter. For example, the notification indicates that in 0.05 seconds a stream of data corresponding to calibrated measurements from a magnetometer will include a discontinuity. In some embodiments, the notification also includes information about the nature of the discontinuity (e.g., a magnitude and/or direction of the discontinuity). For example the notification could include information indicating that the magnetic field measurement of a magnetometer along the X-axis is going to increase by 0.01 gauss due to a recalibration of the magnetometer. Thus, in some embodiments, the notification includes a correction vector that indicates a direction and magnitude of change of one or more components of the compensated sensor data caused by the modification of the first filter and, optionally, information indicating when the correction vector started to be (or will start to be) applied to sensor data by the first filter.

In response to the determination that the first filter has been or will be modified in a way that will create a discontinuity in the compensated sensor data, the respective computer system (e.g., Device 102 or Host 101) adjusts (724) the second filter to compensate for the discontinuity in the compensated sensor data. In some embodiments, the discontinuity in the compensated sensor data is a discontinuity that, if the second filter is not adjusted, would create a prospective corresponding discontinuity in the output information and the respective computer system (e.g., Device 102 or Host 101) adjusts (726) the second filter to compensate for the discontinuity in the compensated sensor data. In some embodiments, adjusting the second filter to compensate for the discontinuity in the compensated sensor data prevents the appearance of the prospective corresponding discontinuity in the output information, as shown in FIG. 6 where Modified Output 616 does not include the discontinuity that would have been present in Unmodified Output 614.

In some embodiments, the adjustment of the second filter is controlled by an operating system of Device 102 and, after determining that the first filter has been or will be modified in a way that will create a discontinuity in the compensated sensor data, Device 102 (or the first filter of Device 102) provides (728) a notification from the first filter of the discontinuity to the operating system, where the notification is used to determine a corresponding adjustment for the second filter. In other words, in some implementations, the discontinuity is an interrupt or message posted to the operating system, and the operating system uses the message to determine how to adjust the second filter.

After adjusting the second filter, the respective computer system (e.g., Device 102 or Host 101) generates (730), via the adjusted second filter, output information based on the compensated sensor data. In some embodiments, adjusting the second filter includes introducing an offset into the output information, where the offset corresponds to a difference between a modified user interface state and an unmodified user interface state. In some of these embodiments, the respective computer system (e.g., Device 102 or Host 101) adjusts (732) the offset over time so as to gradually reduce the difference between the modified user interface state and the unmodified user interface state (e.g., so that the Modified Output 616 gradually converges on the Unmodified Output 614, as shown in FIG. 6). In some embodiments, the offset is reduced over time in accordance with movement of Device 102, as described in greater detail in U.S. patent application Ser. No. 13/165,690, filed on Jun. 21, 2011, entitled "System and Method for Compensating for Drift in a Display of a User Interface State" which is hereby incorporated by reference in its entirety.

It should be understood that the particular order in which the operations in FIGS. 7A-7B have been described are merely exemplary and are not intended to indicate that the described order is the only order in which the operations could be performed. One of ordinary skill in the art would recognize various ways to reorder the operations described herein. Additionally, it should be noted that details of other processes described herein with respect to method 500 (e.g., FIGS. 5A-5D) are also applicable in an analogous manner to method 700 described above with respect to FIGS. 7A-7B. For example, the sensors and calibration operations described above with reference to method 700 may have one or more of the characteristics of the various sensors and calibration operations described herein with reference to method 500. For brevity, these details are not repeated here.

System Structure

Figure 8:
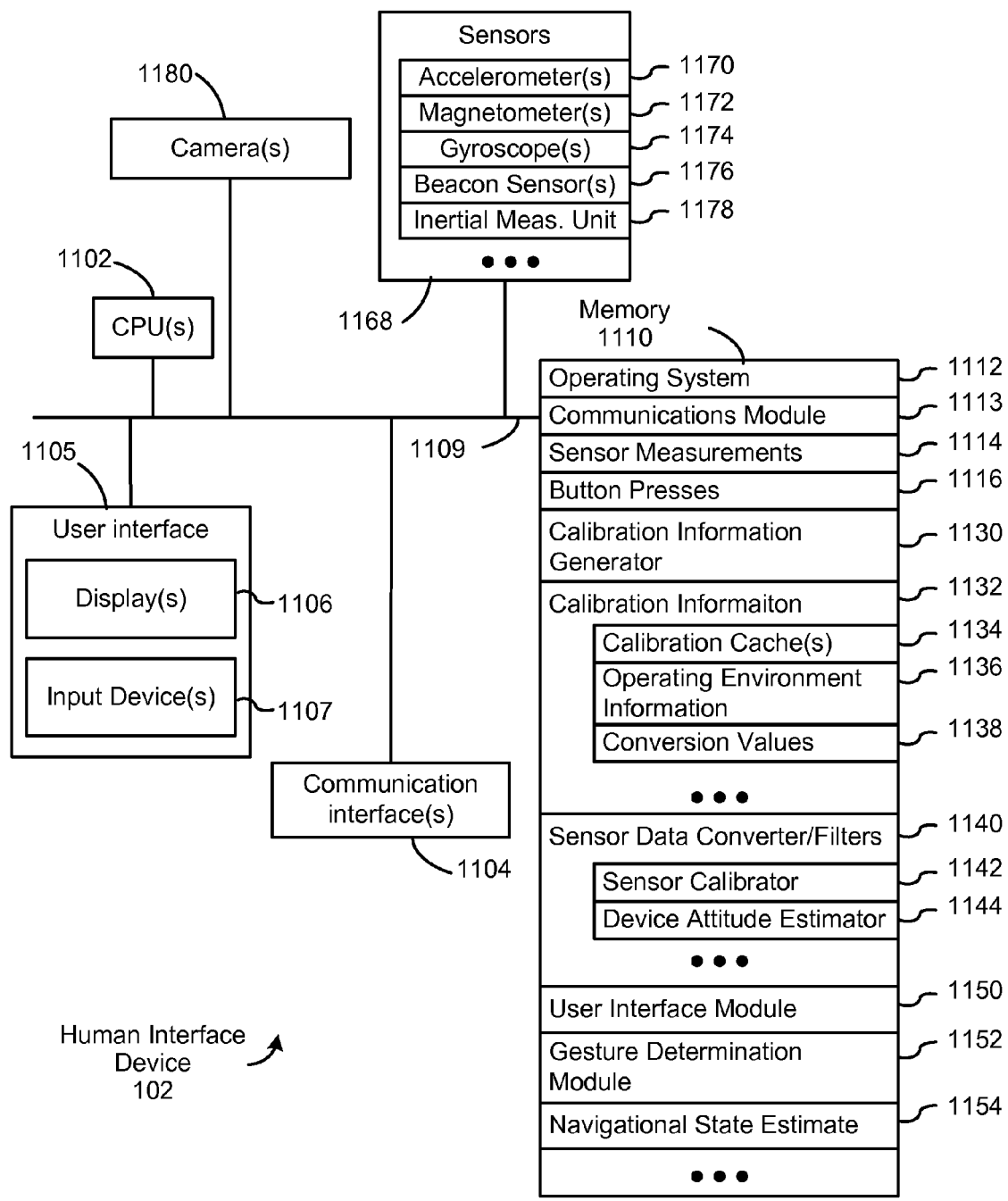
FIG. 8 presents a block diagram of an example human interface device, according to some embodiments.

FIG. 8 is a block diagram of Human Interface Device 102 (herein "Device 102"). Device 102 typically includes one or more processing units (CPUs) 1102, one or more network or other Communications Interfaces 1104 (e.g., a wireless communication interface, as described above with reference to FIG. 1), Memory 1110, Sensors 1168 (e.g., Sensors 220 such as one or more Accelerometers 1170, Magnetometers 1172, Gyroscopes 1174, Beacon Sensors 1176, Inertial Measurement Units 1178, Thermometers, Barometers, and/or Proximity Sensors, etc.), one or more Cameras 1180, and one or more Communication Buses 1109 for interconnecting these components. In some embodiments, Communications Interfaces 1104 include a transmitter for transmitting information, such as accelerometer and magnetometer measurements, and/or the computed navigational state of Device 102, and/or other information to Host 101. Communication buses 1109 typically include circuitry (sometimes called a chipset) that interconnects and controls communications between system components. Device 102 optionally includes user interface 1105 comprising Display 1106 (e.g., Display 104 in FIG. 1) and Input Devices 1107 (e.g., keypads, buttons, etc.). Memory 1110 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1110 optionally includes one or more storage devices remotely located from the CPU(s) 1102. Memory 1110, or alternately the non-volatile memory device(s) within Memory 1110, comprises a non-transitory computer readable storage medium. In some embodiments, Memory 1110 stores the following programs, modules and data structures, or a subset thereof:

- Operating System 1112 that includes procedures for handling various basic system services and for performing hardware dependent tasks;
- Communication Module 1113 that is used for connecting Device 102 to Host 101 via Communication Network Interface(s) 1104 (wired or wireless); Communication Module 1113 is optionally adapted for connecting Device 102 to one or more communication networks, such as the Internet, other wide area networks, local area networks, metropolitan area networks, and so on;
- Sensor Measurements 1114 (e.g., data representing accelerometer measurements, magnetometer measurements, gyroscope measurements, global positioning system measurements, beacon sensor measurements, inertial measurement unit measurements, thermometer measurements, atmospheric pressure measurements, proximity measurements, etc.);
- data representing Button Presses 1116;
- Calibration Information Generator 1130 for collecting sets of sensor measurements and determining sensor calibration conversion values for converting uncalibrated sensor measurements into calibrated sensor data;
- Calibration Information 1132 for calibrating sensors of Device 102, in some embodiments Calibration Information 1132 includes one or more of: Calibration Caches 1134 (e.g., Calibration Caches 404) storing sets of sensor measurements and associated timestamps representative of when the sensor measurements were collected and optionally information indicative of an operating environment of Device 102 at the time that a respective set of sensor measurements was collected; Operating Environment Information 1136 for identifying a current operating environment of Device 102 in accordance with sensor measurements from one or more of the sensors; and sensor calibration Conversion Values 1138 for converting uncalibrated sensor measurements into calibrated sensor data;
- Sensor Data Converter/Filters 1140 for converting raw (uncalibrated) sensor data into output data, including one or more of Sensor Calibrator 1142 for converting raw (uncalibrated) sensor measurements into calibrated sensor data using Sensor Calibration Conversation Values 1134 and Device Attitude Estimator 1144 for estimating device attitude in accordance with calibrated sensor data; in some implementations Device Attitude Estimator 1144 includes a Kalman filter module that determines the attitude of Device 102, as described in U.S. Pat. Pub. No. 2010/0174506 Equations 8-29, wherein the Kalman filter module includes: a sensor model (e.g., the sensor model described in Equations 28-29 of U.S. Pat. Pub. No. 2010/0174506), a dynamics model (e.g., the dynamics model described in Equations 15-21 of U.S. Pat. Pub. No. 2010/0174506), a predict module that performs the predict phase operations of the Kalman filter, an update module that performs the update operations of the Kalman filter, a state vector of the Kalman filter (e.g., the state vector $\hat{x}$ in Equation 10 of U.S. Pat. Pub. No. 2010/0174506), a mapping, Kalman filter matrices, and attitude estimates (e.g., the attitude estimates as obtained from the quaternion in the state vector $\hat{x}$ in Equation 10 of U.S. Pat. Pub. No. 2010/0174506);

optionally, User Interface Module 1150 that receives commands from the user via Input Device(s) 1107 and generates user interface objects in Display(s) 1106 in accordance with the commands and the navigational state of Device 102, User Interface Module 1150 optionally includes one or more of: a cursor position module for determining a cursor position for a cursor to be displayed in a user interface in accordance with changes in a navigational state of the human interface device, an augmented reality module for determining positions of one or more user interface objects to be displayed overlaying a dynamic background such as a camera output in accordance with changes in a navigational state of the human interface device, a virtual world module for determining a portion of a larger user interface (a portion of a virtual world) to be displayed in accordance with changes in a navigational state of the human interface device, and other application specific user interface modules;

optionally, Gesture Determination Module 1152 optionally determines gestures in accordance with detected changes in the navigational state of Device 102; and optionally, data representing Navigational State Estimate 1154 (e.g., an estimate of the position and/or attitude of Device 102).

It is noted that in some of the embodiments described above, Device 102 does not include a Gesture Determination Module 1152, because gesture determination is performed by Host 101. In some embodiments described above, Device 102 also does not include Sensor Data Converter/Filters 1140 because Device 102 transmits sensor measurements and, optionally, data representing Button Presses 1116 to a Host 101 at which a navigational state of Device 102 is determined.

Each of the above identified elements may be stored in one or more of the previously mentioned memory devices, and each of the above identified programs or modules corresponds to a set of instructions for performing a function described above. The set of instructions can be executed by one or more processors (e.g., CPUs 1102). The above identified modules or programs (i.e., sets of instructions) need not be implemented as separate software programs, procedures or modules, and thus various subsets of these modules may be combined or otherwise re-arranged in various embodiments. In some embodiments, Memory 1110 may store a subset of the modules and data structures identified above. Furthermore, Memory 1110 may store additional modules and data structures not described above.

Although FIG. 8 shows a "Human Interface Device 102," FIG. 8 is intended more as functional description of the various features which may be present in a human interface device. In practice, and as recognized by those of ordinary skill in the art, items shown separately could be combined and some items could be separated.

Figure 9:
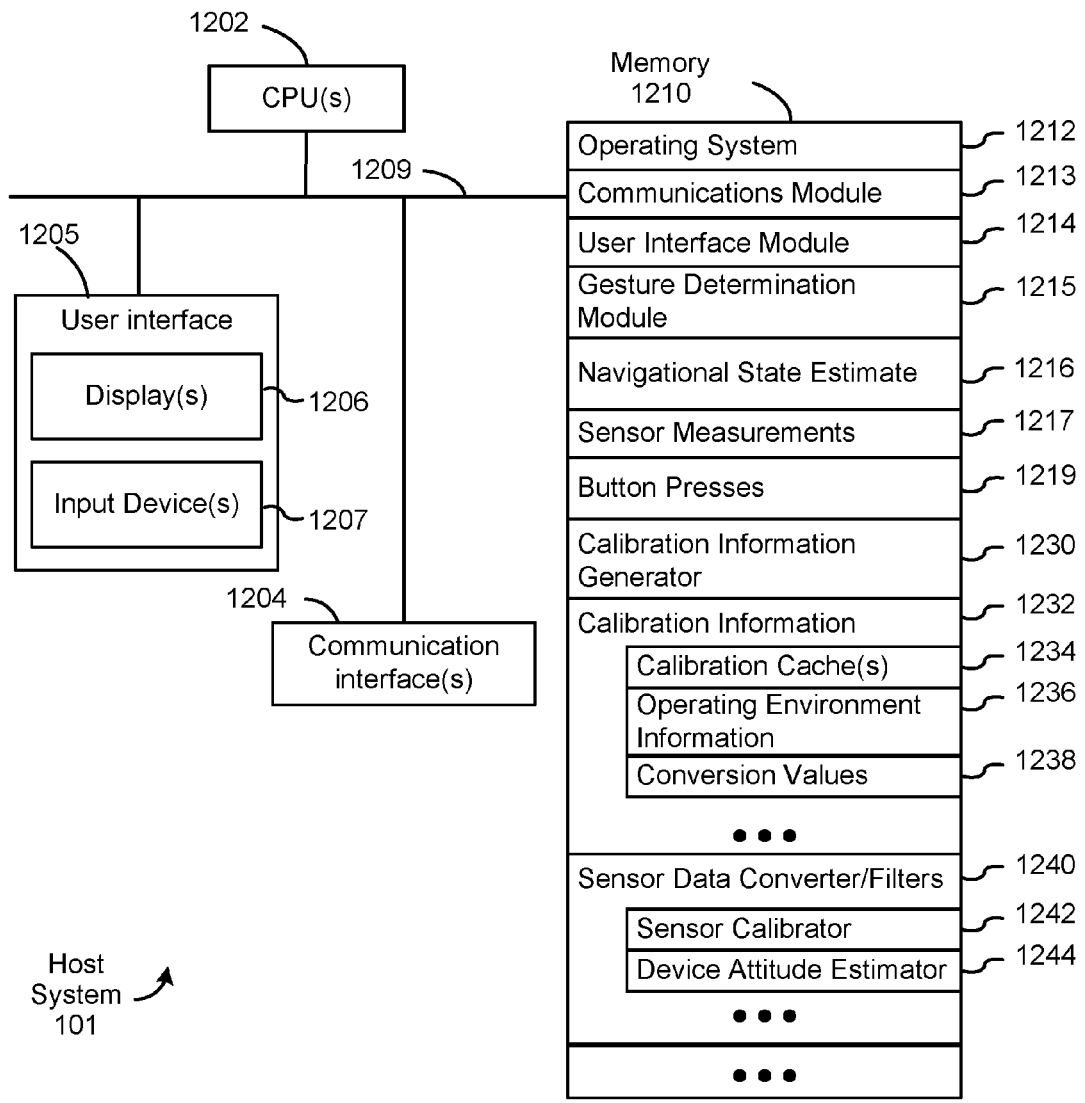
FIG. 9 presents a block diagram of an example host computer system, according to some embodiments.

FIG. 9 is a block diagram of Host Computer System 101 (herein "Host 101"). Host 101 typically includes one or more processing units (CPUs) 1202, one or more network or other Communications Interfaces 1204 (e.g., any of the wireless interfaces described above with reference to FIG. 1), Memory 1210, and one or more Communication Buses 1209 for interconnecting these components. In some embodiments, Communication Interfaces 1204 include a receiver for receiving information, such as accelerometer and magnetometer measurements, and/or the computed attitude of a human interface device (e.g., Device 102), and/or other information from Device 102. Communication Buses 1209 optionally include circuitry (sometimes called a chipset) that interconnects and controls communications between system components. Host 101 optionally includes a User Interface 1205 comprising a Display 1206 (e.g., Display 104 in FIG. 1) and Input Devices 1207 (e.g., a human interface device such as a multi-dimensional pointer, a mouse, a keyboard, a trackpad, a trackball, a keypad, buttons, etc.). Memory 1210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1210 optionally includes one or more storage devices remotely located from the CPU(s) 1202. Memory 1210, or alternately the non-volatile memory device(s) within Memory 1210, comprises a non-transitory computer readable storage medium. In some embodiments, Memory 1210 stores the following programs, modules and data structures, or a subset thereof:

Operating System 1212 that includes procedures for handling various basic system services and for performing hardware dependent tasks;

Communication Module 1213 that is used for connecting Host 101 to Device 102, and/or other devices or systems via Communication Network Interface(s) 1204 (wired or wireless), and for connecting Host 101 to one or more communication networks, such as the Internet, other wide area networks, local area networks, metropolitan area networks, and so on;

User Interface Module 1214 that receives commands from the user via Input Device(s) 1207 and generates user interface objects in Display(s) 1206; the user interface module optionally includes one or more of: a cursor position module for determining a cursor position for a cursor to be displayed in a user interface in accordance with changes in a navigational state of Device 102, an augmented reality module for determining positions of one or more user interface objects to be displayed overlaying a dynamic background such as a camera output in accordance with changes in a navigational state of Device 102, a virtual world module for determining a portion of a larger user interface (a portion of a virtual world) to be displayed in accordance with changes in a navigational state of Device 102, and other application specific user interface modules;

Gesture Determination Module 1215 that optionally determines gestures in accordance with detected changes in navigational state of Device 102;

optionally, data representing Navigational State Estimate 1216 (e.g., an estimate of the position and/or attitude of Device 102) that is received from Device 102;

optionally, data representing Sensor Measurements 1217 (e.g., accelerometer measurements, magnetometer measurements, gyroscope measurements, global positioning system measurements, beacon sensor measurements, inertial measurement unit measurements etc.) received from Device 102 and/or determined at Host 101;

optionally, data representing Button Presses 1219 received from Device 102;

optionally, Calibration Information Generator 1230 for collecting sets of sensor measurements and determining sensor calibration conversion values for converting uncalibrated sensor measurements into calibrated sensor data;

optionally, Calibration Information 1232 for calibrating sensors of Device 102, in some embodiments Calibration Information 1232 includes one or more of Calibration Caches 1234 (e.g., Calibration Caches 404) storing sets of sensor measurements and associated timestamps representative of when the sensor measurements were collected and optionally information indicative of an operating environment of Device 102 at the time that a respective set of sensor measurements was collected, Operating Environment Information 1236 for identifying a current operating environment of Device 102 in accordance with sensor measurements from one or more of the sensors, and Sensor Calibration Conversion Values 1238 for converting uncalibrated sensor measurements into calibrated sensor data;

optionally, Sensor Data Converter/Filters 1240 for converting raw (uncalibrated) sensor data into output data, including one or more of Sensor Calibrator 1242 for converting raw (uncalibrated) sensor measurements into calibrated sensor data using Sensor Calibration Conversation Values 1234 and Device Attitude Estimator 1244 for estimating device attitude in accordance with calibrated sensor data, in some implementations Device Attitude Estimator 1244 includes a Kalman filter module that determines the attitude of Device 102, as described in U.S. Pat. Pub. No. 2010/0174506 Equations 8-29, wherein the Kalman filter module includes: a sensor model (e.g., the sensor model described in Equations 28-29 of U.S. Pat. Pub. No. 2010/0174506), a dynamics model (e.g., the dynamics model described in Equations 15-21 of U.S. Pat. Pub. No. 2010/0174506), a predict module that performs the predict phase operations of the Kalman filter, an update module that performs the update operations of the Kalman filter, a state vector of the Kalman filter (e.g., the state vector $\hat{x}$ in Equation 10 of U.S. Pat. Pub. No. 2010/0174506), a mapping, Kalman filter matrices, and attitude estimates (e.g., the attitude estimates as obtained from the quaternion in the state vector $\hat{x}$ in Equation 10 of U.S. Pat. Pub. No. 2010/0174506).

It is noted that in some of the embodiments described above, Host 101 does not store data representing Sensor Measurements 1217, and also does not include Sensor Data Converter/Filters 1240 because sensor measurements of Device 102 are processed at Device 102, which sends data representing Navigational State Estimate 1216 to Host 101. In other embodiments, Device 102 sends data representing Sensor Measurements 1217 to Host 101, in which case the modules for processing that data are present in Host 101.

Each of the above identified elements may be stored in one or more of the previously mentioned memory devices, and each of the above identified programs or modules corresponds to a set of instructions for performing a function described above. The set of instructions can be executed by one or more processors (e.g., CPUs 1202). The above identified modules or programs (i.e., sets of instructions) need not be implemented as separate software programs, procedures or modules, and thus various subsets of these modules may be combined or otherwise re-arranged in various embodiments. The actual number of processors and software modules used to implement Host 101 and how features are allocated among them will vary from one implementation to another. In some embodiments, Memory 1210 may store a subset of the modules and data structures identified above. Furthermore, Memory 1210 may store additional modules and data structures not described above.

Note that methods 500 and 700 described above are optionally governed by instructions that are stored in a non-transitory computer readable storage medium and that are executed by one or more processors of Device 102 or Host 101. As noted above, in some embodiments these methods may be performed in part on Device 102 and in part on Host 101, or on a single integrated system which performs all the necessary operations. Each of the operations shown in FIGS. 5A-5D and 7A-7B optionally correspond to instructions stored in a computer memory or computer readable storage medium. The computer readable storage medium optionally includes a magnetic or optical disk storage device, solid state storage devices such as Flash memory, or other non-volatile memory device or devices. In some embodiments, the computer readable instructions stored on the computer readable storage medium are in source code, assembly language code, object code, or other instruction format that is interpreted by one or more processors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
at a computer system including one or more processors and memory:
at each respective time of a plurality of respective times:
collecting a respective set of sensor measurements from a first set of sensors of a device at the respective time; and
associating a respective operating environment of the device with the respective set of sensor measurements, wherein the respective operating environment corresponds to values of one or more environmental parameters of a physical environment in which the device is operating at the respective time;
storing calibration information corresponding to the respective set of sensor measurements in a respective data structure associated with the respective operating environment of the device; and
after storing, in a first data structure, calibration information corresponding to a first operating environment:
determining a current operating environment of the device;
in accordance with a determination that the current operating environment of the device is consistent with the first operating environment and that the calibration information corresponding to the first operating environment meets predefined measurement diversity criteria, calibrating at least one sensor of the first set of one or more sensors for the first operating environment using the sensor measurements from the first data structure;
in accordance with a determination that the current operating environment of the device is inconsistent with the first operating environment, excluding the calibration information stored in the first data structure from consideration when calibrating one or more sensors of the first set of sensors for the current operating environment; and
in accordance with a determination that the current operating environment of the device is consistent with the first operating environment, the calibration information corresponding to the first operating environment does not meet the predefined measurement diversity criteria, and a calibration time threshold has been exceeded, prompting a user of the device to reorient the device so that one or more additional sets of sensor measurements can be retrieved in the first operating environment, wherein the one or more additional sets of sensor measurements are sensor measurements that enable the calibration information corresponding to the first operating environment to meet the predefined measurement diversity criteria.

2. The method of claim 1, wherein the measurement diversity criteria include one or more of:
spatial orientation diversity criteria;
spatial position diversity criteria;
non-inertial frame of reference diversity criteria; and
inertial frame of reference diversity criteria.

3. The method of claim 1, wherein:
the device comprises a second set of one or more sensors for determining environmental parameters for the environment within which the device is located, in accordance with sensor measurements from the second set of sensors; and
the current operating environment of the device is determined in accordance with the environmental parameters determined by the second set of sensors.

4. The method of claim 1, wherein
the device comprises a processor programmed to obtain information related to environmental parameters for the environment within which the device is located; and
the current operating environment of the device is determined in accordance with the environmental parameters.

5. The method of claim 1, wherein:
the device is configured to be operated in any of a plurality of different physical configurations; and
the operating environment of the device at the respective time is determined based at least in part on a current physical configuration of the device at the respective time.

6. The method of claim 1, wherein the first set of sensors includes one or more of: a magnetometer, an accelerometer, a gyroscope, a camera, a barometer, a thermometer, and a range estimator.

7. The method of claim 1, wherein each of the operating environments corresponds to measurements of one or more of: atmospheric pressure, temperature, magnetic field, focal distance, stereoscopic distance, location, and magnetic inclination.

8. The method of claim 1, wherein excluding the calibration information stored in the first data structure from consideration when calibrating one or more sensors of the first set of sensors for the current operating environment includes deleting the calibration information stored in the first data structure.

9. The method of claim 1, wherein excluding the calibration information stored in the first data structure from consideration when calibrating a respective sensor of the first set of sensors for the current operating environment includes using only data stored outside of the first data structure for calibrating the respective sensor, while retaining the data stored in the first data structure for future calibration operations.

10. The method of claim 1, further comprising, after collecting, from the first set of sensors, a particular set of sensor measurements associated with the first operating environment:
evaluating the contribution of the particular set of sensor measurements from the first set of sensors to a diversity of previously collected sets of sensor measurements associated with the first operating environment; and
in accordance with a determination that the contribution of the particular set of sensor measurements to the diversity of previously collected sets of sensor measurements associated with the first operating environment is below a predefined threshold, discarding the particular set of sensor measurements or storing the particular set of sensor measurements in the first data structure and discarding an older set of sensor measurements from the first data structure.

11. The method of claim 1, further comprising, for each of a plurality of respective operating environments:
generating a respective operating environment identifier that corresponds to the values for environmental parameters that characterize the respective operating environment; and
storing the operating environment identifier in association with a plurality of sets of sensor measurements collected in the respective operating environment.

12. The method of claim 1, further comprising, after determining the current operating environment of the device, and in accordance with the determination that:
the current operating environment of the device is consistent with the first operating environment,
the calibration information corresponding to the first operating environment does not meet the predefined measurement diversity criteria, and
a calibration time threshold has been exceeded,
calibrating at least one sensor of the first set of one or more sensors for the first operating environment using the sensor measurements from the first data structure.

13. The method of claim 1, wherein:
prior to calibrating the first set of sensors for the first operating environment, the first set of sensors were calibrated for a prior operating environment having a prior set of environmental parameters; and
the method further comprises:
while the first set of sensors are calibrated for the prior operating environment, using the first set of sensors to determine an attitude of the device in the prior operating environment; and
after calibrating the first set of sensors for the first operating environment, using the first set of sensors to determine an attitude of the device in the first operating environment.

14. The method of claim 3, wherein the second set of sensors includes at least one sensor that detects a quantity with no direct effect on the environmental parameters and the detected quantity is combined with a known relation between the detected quantity and the environmental parameters to determine the current operating environment of the device.

15. The method of claim 3, wherein the first set of sensors and the second set of sensors include at least one common sensor.

16. The method of claim 3, wherein the first set of sensors includes at least one sensor that is not included in the second set of sensors.

17. The method of claim 3, wherein the second set of sensors includes at least one sensor that is not included in the first set of sensors.

18. The method of claim 3, wherein the second set of sensors includes one or more of: a magnetometer, an accelerometer, a gyroscope, a camera, a barometer, a thermometer, and a range estimator.

19. The method of claim 4, wherein the information related to the environmental parameters includes an angle between predefined vectors corresponding to a magnetic field and gravity.

20. The method of claim 4, wherein the information related to the environmental parameters includes battery status information indicating that a battery of the device has been changed.

21. The method of claim 5, wherein the current physical configuration of the device at the respective time is determined in accordance with system information stored on the device.

22. The method of claim 10, wherein, the older set of sensor measurements comprise sensor measurements not needed to meet the predefined measurement diversity criteria after the particular set of sensor measurements have been stored in the first data structure.

23. A computer system, comprising:
one or more processors;
a first set of one or more sensors;
memory; and
one or more programs, wherein the one or more programs are stored in the memory and configured to be executed by the one or more processors, the one or more programs including instructions for:
at each respective time of a plurality of respective times:
collecting a respective set of sensor measurements from the first set of sensors of a device at the respective time; and
associating a respective operating environment of the device with the respective set of sensor measurements, wherein the respective operating environment corresponds to values of one or more environmental parameters of a physical environment in which the device is operating at the respective time;
storing calibration information corresponding to the respective set of sensor measurements in a respective data structure associated with the respective operating environment of the device; and
after storing, in a first data structure, calibration information corresponding to a first operating environment:
determining a current operating environment of the device;
in accordance with a determination that the current operating environment of the device is consistent with the first operating environment and that the calibration information corresponding to the first operating environment meets predefined measurement diversity criteria, calibrating at least one sensor of the first set of one or more sensors for the first operating environment using the sensor measurements from the first data structure;
in accordance with a determination that the current operating environment of the device is inconsistent with the first operating environment, excluding the calibration information stored in the first data structure from consideration when calibrating one or more sensors of the first set of sensors for the current operating environment; and
in accordance with a determination that the calibration information corresponding to the first operating environment does not meet the predefined measurement diversity criteria, prompting a user of the device to reorient the device so that one or more additional sets of sensor measurements can be retrieved in the first operating environment, wherein the one or more additional sets of sensor measurements are sensor measurements that enable the calibration information corresponding to the first operating environment to meet the predefined measurement diversity criteria.

24. A non-transitory computer readable storage medium storing one or more programs, the one or more programs comprising instructions, which when executed by a computer system with one or more processors, cause the computer system to:
at each respective time of a plurality of respective times:
collect a respective set of sensor measurements from a first set of sensors of a device at the respective time; and
associate a respective operating environment of the device with the respective set of sensor measurements, wherein the respective operating environment corresponds to values of one or more environmental parameters of a physical environment in which the device is operating at the respective time;
store calibration information corresponding to the respective set of sensor measurements in a respective data structure associated with the respective operating environment of the device; and
after storing, in a first data structure, calibration information corresponding to a first operating environment:
determine a current operating environment of the device;
in accordance with a determination that the current operating environment of the device is consistent with the first operating environment and that the calibration information corresponding to the first operating environment meets predefined measurement diversity criteria, calibrate at least one sensor of the first set of one or more sensors for the first operating environment using the sensor measurements from the first data structure;
in accordance with a determination that the current operating environment of the device is inconsistent with the first operating environment, exclude the calibration information stored in the first data structure from consideration when calibrating one or more sensors of the first set of sensors for the current operating environment; and
in accordance with a determination that the calibration information corresponding to the first operating environment does not meet the predefined measurement diversity criteria, prompt a user of the device to reorient the device so that one or more additional sets of sensor measurements can be retrieved in the first operating environment, wherein the one or more additional sets of sensor measurements are sensor measurements that enable the calibration information corresponding to the first operating environment to meet the predefined measurement diversity criteria.

* * * * *